(12) United States Patent
Moss et al.

(10) Patent No.: US 11,625,892 B1
(45) Date of Patent: *Apr. 11, 2023

(54) VISUALIZATION TECHNIQUES FOR DATA LABELING

(71) Applicant: Scale AI, Inc., San Francisco, CA (US)

(72) Inventors: Evan Moss, San Francisco, CA (US); Steven Hao, San Jose, CA (US); Leigh Marie Braswell, San Francisco, CA (US); Akshat Bubna, San Francisco, CA (US); Chiao-Lun Cheng, San Francisco, CA (US); Samuel Jacob Clearman, San Francisco, CA (US); Nathaniel John Herman, San Francisco, CA (US); Guido Leandro Maliandi, Ciudad Autónoma de Buenos Aires (AR)

(73) Assignee: SCALE AI, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/400,982

(22) Filed: Aug. 12, 2021

Related U.S. Application Data

(63) Continuation of application No. 16/518,809, filed on Jul. 22, 2019, now Pat. No. 11,222,460.

(51) Int. Cl.
*G06T 15/20* (2011.01)
*G06T 7/90* (2017.01)
(Continued)

(52) U.S. Cl.
CPC ............ *G06T 15/205* (2013.01); *G01S 17/86* (2020.01); *G01S 17/89* (2013.01); *G06T 7/90* (2017.01);
(Continued)

(58) Field of Classification Search
CPC ..................... G06T 15/205; G06T 7/90; G06T 2207/10024; G01S 17/86; G01S 17/89; G06V 10/40; G06V 10/751
See application file for complete search history.

(56) References Cited

U.S. PATENT DOCUMENTS 10,353,073 B1 * 7/2019 Anderberg ................ G06T 5/20
2004/0217956 A1 11/2004 Besl et al.
(Continued)

*Primary Examiner* — Yu Chen
(74) *Attorney, Agent, or Firm* — Artegis Law Group, LLP

(57) ABSTRACT

One embodiment provides a user interface (UI) that permits users to select how point cloud colorings determined from multiple data sources are blended together in a rendering of a point cloud. The data sources may include photographic, label, and/or LIDAR intensity data. To improve frame rates, an aggregated point cloud may be generated using a spatial hash of a large set of points and sampling of each hash bucket based on the number of points therein and a user-configurable density. Sizes of points in the point cloud may decrease proportionally to distance from a viewer, but increase based on an activation function that enlarges points greater than a threshold distance from the viewer. In addition, luminance statistics for sub-regions of photographic data and dominant colors determined from photographic data may be used to automatically determine color properties to apply to a point cloud coloring.

18 Claims, 15 Drawing Sheets

(51) Int. Cl.
  G01S 17/89 (2020.01)
  G01S 17/86 (2020.01)
  G06V 10/40 (2022.01)
  G06V 10/75 (2022.01)

(52) U.S. Cl.
  CPC ............ G06V 10/40 (2022.01); G06V 10/751 (2022.01); *G06T 2207/10024* (2013.01)

(56) References Cited

U.S. PATENT DOCUMENTS

| | | |
|---|---|---|
| 2009/0021516 A1 | 1/2009 | Graziani et al. |
| 2011/0244919 A1* | 10/2011 | Aller ............... G06Q 30/06 382/165 |
| 2012/0250978 A1 | 10/2012 | Taylor |
| 2015/0161812 A1 | 6/2015 | Weill et al. |
| 2016/0217611 A1 | 7/2016 | Pylvaenaeinen et al. |
| 2016/0249039 A1 | 8/2016 | Tran et al. |
| 2018/0308283 A1* | 10/2018 | Wang ............... G06T 19/003 |
| 2018/0315248 A1 | 11/2018 | Bastov et al. |
| 2018/0329066 A1 | 11/2018 | Pacala |
| 2019/0004534 A1 | 1/2019 | Huang et al. |
| 2019/0035150 A1 | 1/2019 | Owechko |
| 2019/0043253 A1 | 2/2019 | Lucas et al. |
| 2019/0108447 A1* | 4/2019 | Kounavis ............... G06V 40/28 |
| 2019/0206128 A1 | 7/2019 | Logan et al. |
| 2019/0235083 A1 | 8/2019 | Zhang et al. |
| 2020/0134833 A1* | 4/2020 | Biswas ............... G06V 10/267 |

\* cited by examiner

VISUALIZATION TECHNIQUES FOR DATA LABELING

CROSS-REFERENCE TO RELATED APPLICATIONS

This application is a continuation of the co-pending U.S. patent application titled, "VISUALIZATION TECHNIQUES FOR DATA LABELING," filed on Jul. 22, 2019, and having Ser. No. 16/518,809. The subject matter of this related application is hereby incorporated herein by reference.

BACKGROUND

Technical Field

Embodiments of the present disclosure relate generally to data visualization and, more specifically, to visualization techniques for data labeling.

Description of the Related Art

Advances in the field of machine learning and increases in available computing power have led to a proliferation in the applications of machine learning. Many machine learning models, including deep neural networks, require large amounts of labeled data to train and verify. Such labeled data typically includes samples that have been tagged with labels. For example, labeled images in which the classifications and locations of objects (e.g., people, cars, etc.) have been tagged may be used to train a machine learning model to perform object classification and localization.

Labeled data can be obtained by relying on human judgment to tag data with appropriate labels. However, such manual labeling of data is time consuming and labor intensive, and few traditional tools exist to facilitate the process of labeling data.

As the foregoing illustrates, what is needed in the art are techniques to facilitate data labeling.

SUMMARY

One embodiment provides a computer-implemented method for visualizing data. The method includes displaying, in a first section of a user interface, a rendering of a three-dimensional (3D) scene in which colors are determined based on at least one of photographic data, label data, or light detection and ranging (LIDAR) intensity data. The method further includes, displaying, in a second section of the user interface, at least one element adjustable to select a blending of the colors determined based on the at least one of photographic data, label data, or LIDAR intensity data.

Another embodiment provides a computer-implemented method for visualizing a point cloud. The method includes determining a plurality of point cloud colorings for the point cloud based on data from respective data sources. The method further includes blending the plurality of point cloud colorings based on a user selection. In addition, the method includes rendering the point cloud based on the blended point cloud colorings.

Further embodiments include non-transitory computer-readable storage media storing instructions that, when executed by a computer system, cause the computer system to perform the methods set forth above, and computer systems programmed to carry out the methods set forth above.

One advantage of the disclosed techniques is that a user can adjust the blending of point cloud colorings determined based on various data, such as photographic data, label data, and/or LIDAR intensity data. Doing so may facilitate labeling of the point cloud and/or verification of such labeling. These technical advantages represent one or more technological advancements over prior art approaches.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

In the following description, numerous specific details are set forth to provide a more thorough understanding of the present disclosure. However, it will be apparent to one of skilled in the art that the present disclosure may be practiced without one or more of these specific details.

System Overview

Figure 1:
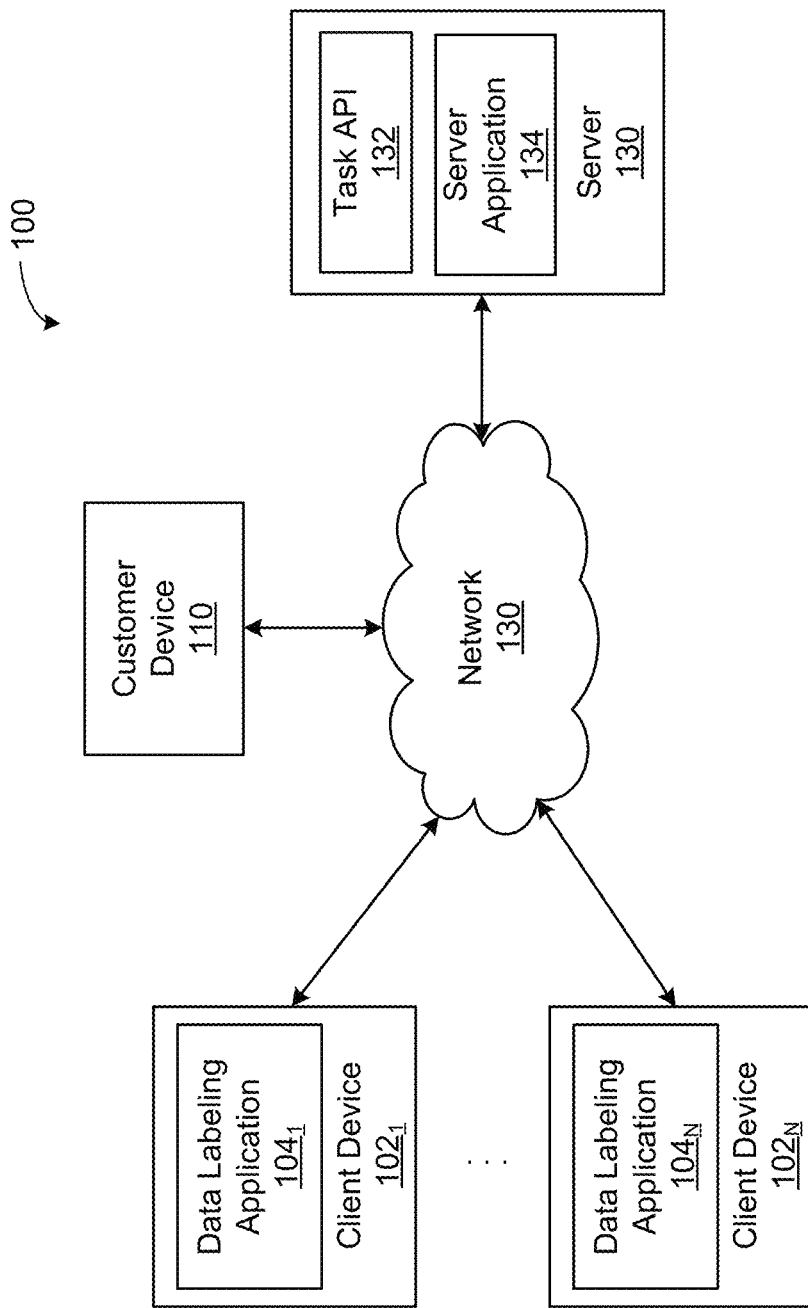
FIG. 1 is a conceptual illustration of a system configured to implement one or more embodiments.

FIG. 1 is a conceptual illustration of a system 100 configured to implement one or more embodiments. As shown, the system 100 includes, without limitation, a server computing device 130 and a number of client devices 102$_{1-N}$, each of which is referred to individually herein as a client device 102, that interoperate to facilitate data labeling by users of the client devices 102$_{1-N}$, in response to a customer request. The server 130, the client devices 102$_{1-N}$, and a customer device 110 communicate via a network 130, which may be a wide area network (WAN) such as the Internet, a local area network (LAN), or any other suitable network. Although a single server 130 and customer device 110 are shown for illustrative purposes, the system 100 may generally include any number of servers, customer devices, and client devices, each of which may be a physical computing system or a virtual computing system running in, e.g., a data center or cloud.

Illustratively, the server 130 exposes a task application programming interface (API) 132 that allows customers to send data, and data labeling requests, via API calls. Any suitable data and labeling requests may be transmitted via such API calls to the server 130. For example, in the context of autonomous vehicles, photographic, LIDAR (light detection and ranging), and/or radar (radio detection and ranging) data captured by vehicle-mounted sensors may be uploaded from the customer device 110 to the server 130, along with a request that particular types of objects (e.g., vehicles, bicycles, pedestrians, etc.) be tagged in such data. GPS (global positioning system) data may also be uploaded and is typically included in LIDAR data.

In some embodiments, the server application 134 may require the data and data labeling requests submitted via API calls to satisfy predefined restrictions. For example, restrictions may exist on which classes (e.g., vehicles, pedestrians, buildings, etc.) of objects can be labeled, the format and size of the data, etc.

The server application 134 processes data received via the task API 132 and sends the processed data to data labeling applications 104$_{1-N}$ running in the client devices 102$_{1-N}$, along with indications of data labeling tasks to be performed by users of the client devices 102$_{1-N}$, based on the customer's request. Any suitable processing of received data may be performed by the server application 134. For example, in some embodiments, the server application 134 could convert photographic, LIDAR, or radar data received in different formats to a single format that the data labeling applications 104$_{1-N}$ can read. As another example, the server application 134 could compress the received data to a smaller size. Although the server application 134 is shown as a single application for illustrative purposes, it should be understood that functionality of the server application 134 may be performed by multiple applications or other types of software in alternative embodiments.

Each of the data labeling applications 104$_{1-N}$, referred to individually herein as a data labeling application 104, digests and renders data received from the server application 134 for displayed via a user interface (UI). In some embodiments, the data labeling application 104 may render one or more colored point clouds for visualizing three-dimensional (3D) data (e.g., LIDAR and/or radar data), while permitting users to navigate and view the point clouds from different perspectives. As discussed in greater detail below, the data labeling application 104 may employ various techniques during the rendering of a point cloud. For example, in some embodiments, the data labeling application 104 may use down sampling to obtain an aggregated point cloud that includes only points conveying the most information. As another example, the data labeling application 104 could, based on a user specification, blend point cloud colorings derived from different data sources (e.g., photographic, label, and/or LIDAR intensity data). In addition to displaying rendered point clouds via a UI, the data labeling application 104 may also display photographs associated with those point clouds at the same time.

In some embodiments, the data labeling application 104 may provide tools to facilitate data labeling tasks. For example, the tools could allow a user to draw annotations in the form of cuboids, label points as belonging to particular objects, etc. using a mouse and/or keyboard. As additional examples, tools could be provided that automatically adjust the position and/or orientation of a user-designated cuboid, propagate a user-designated cuboid from a key frame to other frames, etc., thereby aiding the user in performing data labeling tasks.

Figure 2:
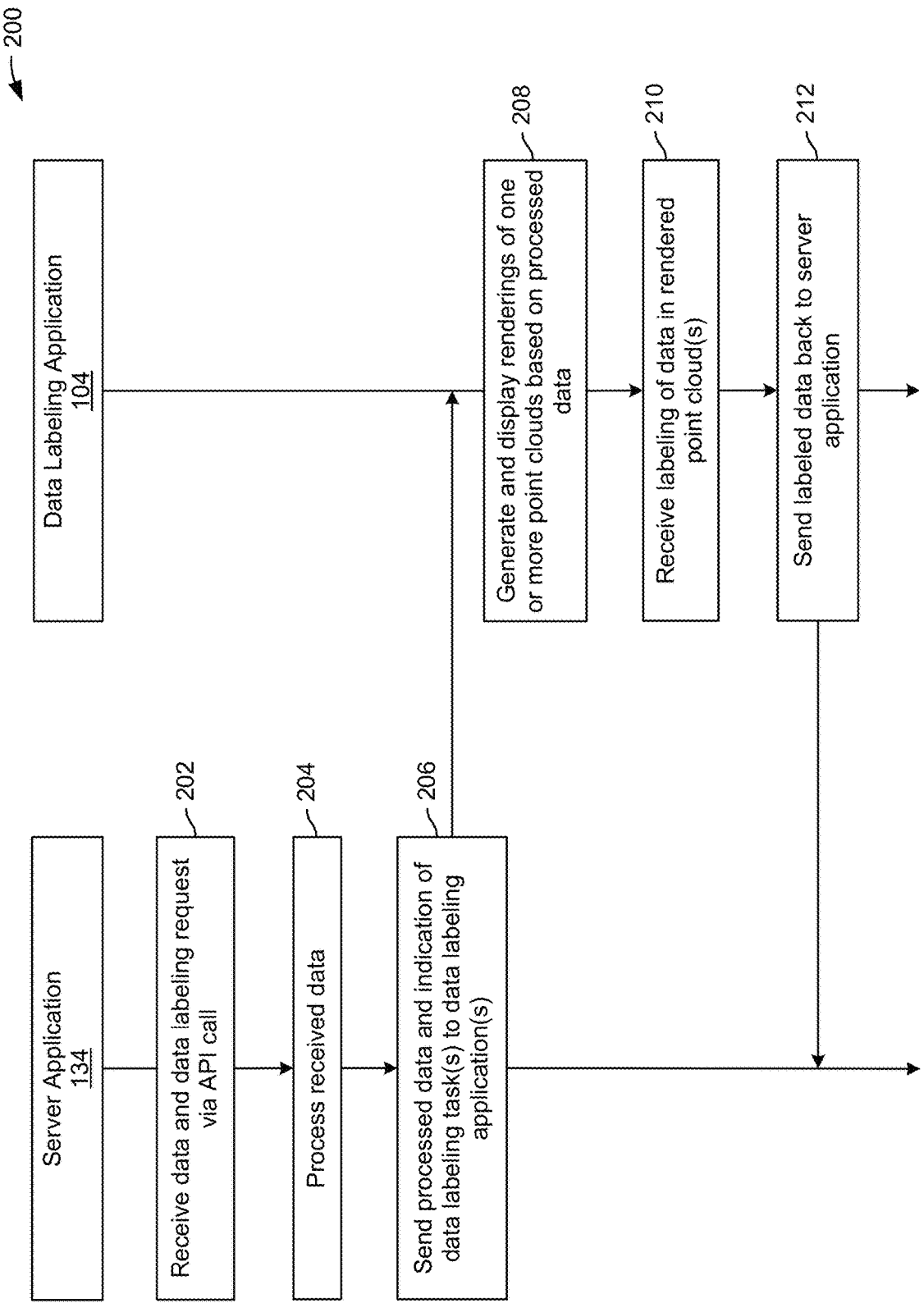
FIG. 2 is a flow diagram of method steps for processing data labeling requests, according to various embodiments.

FIG. 2 is a flow diagram of method steps for processing data labeling requests, according to various embodiments. Although the method steps are described with reference to the system of FIG. 1, persons skilled in the art will understand that any system may be configured to implement the method steps, in any order, in other embodiments.

As shown, a method 200 begins at step 202, where the server application 134 receives data and a data labeling request via an API call. The data may be in any suitable format acceptable to the server application 134. For example, the server application 134 may require data to be sent in one or more JavaScript Object Notation (JSON) files. Similarly, the data labeling request may need to satisfy certain restrictions, such as which classes (e.g., cars, pedestrians, buildings, etc.) of objects can be labeled.

At step 204, the server application 134 processes the received data. Any suitable processing may be performed by the server application 134. As described, the processing in some embodiments may include, e.g., compressing the received data and/or converting the received data into a format that can be read by data labeling application(s). For example, the received data could be converted to a data format in which points of a 3D point cloud are represented in a list as (x, y, z) coordinates with associated time stamps.

At step 206, the server application 134 sends the processed data and an indication of data labeling task(s), based on the received request, to one or more data labeling applications. Although one data labeling application 104 is shown for illustrative purposes, it should be understood that the server application 134 may send the processed data and indication of data labeling task(s), via a network, to any number of data labeling applications running on different client devices.

At step 208, a data labeling application 104 that receives the processed data generates and displays renderings of one or more point clouds based on the received data. As described, the data labeling application 104 may display the rendered point cloud(s) via a UI that permits a user to navigate and view the point cloud(s) from different perspectives. In addition, the UI may display photographs associated with the rendered point cloud(s), and the data labeling application 104 may provide tools to facilitate labeling of the rendered point cloud(s) via the UI.

At step 210, the data labeling application 104 receives labeling of data in the rendered point cloud(s). In some embodiments, a user may navigate the point cloud(s) spatially and/or temporally and then draw annotations such as cuboids, label points as belonging to particular objects, etc. For example, the user could look around a scene, identify objects of interest, use a mouse to indicate where those objects are located, use the mouse and a keyboard to precisely size cuboids around the objects, etc. In such a case, the user may further navigate forward and/or backwards in time to see where the objects move over time, and label the objects in every frame that is associated with a distinct point in time. As described, the data labeling application 104 may provide tools that enable such labeling, as well as tools that facilitate user labeling by, e.g., automatically adjusting the position and/or orientation of a user-designated cuboid, propagating a cuboid from one frame designated as a key frame to other frames, etc.

At step 212, the data labeling application 104 sends the labeled data back to the server application 134. The labeled data may be sent to the server application 134 via a network, such as the Internet, and the server application 134 may then return the labeled data to the customer. In some embodiments, optional verification and/or other processing may be performed prior to returning labeled data to the customer.

Figure 3:
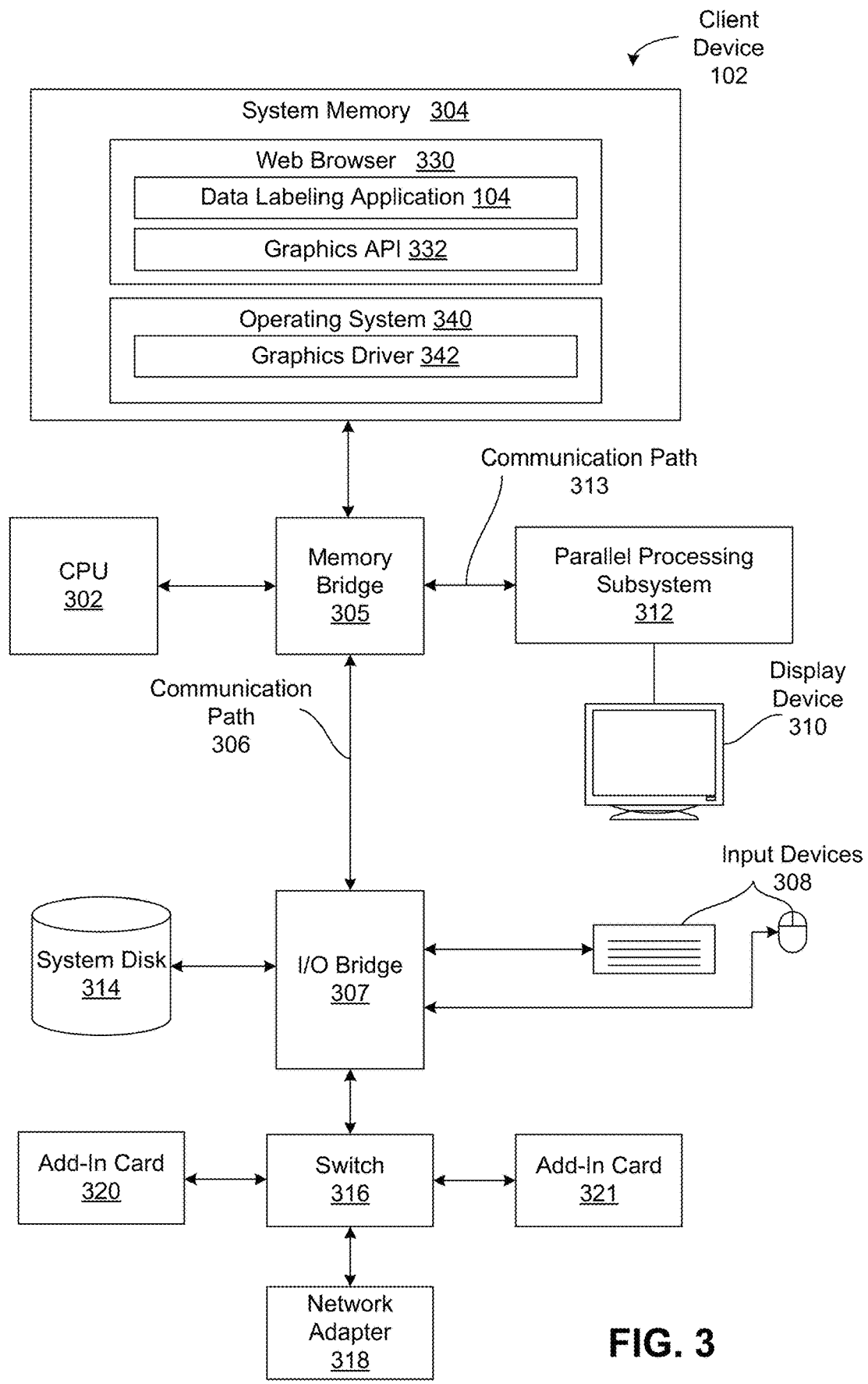
FIG. 3 illustrates one of the client devices shown in FIG. 2, according to various embodiments.

FIG. 3 illustrates one of the client devices $102_{1-N}$, according to one or more embodiments. Although a client device 102 is shown for illustrative purposes, it should be understood that the server 130 and the customer device 110 may include similar physical components as the client device 102, but run different software such as the server application 134.

As shown, the client device 102 includes, without limitation, a central processing unit (CPU) 302 and a system memory 304 coupled to a parallel processing subsystem 312 via a memory bridge 305 and a communication path 313. The memory bridge 304 is further coupled to an I/O (input/output) bridge 307 via a communication path 306, and the I/O bridge 307 is, in turn, coupled to a switch 316.

In operation, the I/O bridge 307 is configured to receive user input information from input devices 308, such as a keyboard or a mouse, and forward the input information to the CPU 302 for processing via the communication path 106 and the memory bridge 305. The switch 316 is configured to provide connections between the I/O bridge 307 and other components of the computer system 300, such as a network adapter 318 and various add-in cards 320 and 321.

As also shown, the I/O bridge 307 is coupled to a system disk 314 that may be configured to store content and applications and data for use by CPU 302 and parallel processing subsystem 312. As a general matter, the system disk 314 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to the I/O bridge 307 as well.

In various embodiments, the memory bridge 305 may be a Northbridge chip, and the I/O bridge 307 may be a Southbridge chip. In addition, communication paths 306 and 313, as well as other communication paths within the client device 102, may be implemented using any technically suitable protocols, including, without limitation, AGP (Accelerated Graphics Port), HyperTransport, or any other bus or point-to-point communication protocol known in the art.

In some embodiments, the parallel processing subsystem 312 comprises a graphics subsystem that delivers pixels to a display device 310 that may be any conventional cathode ray tube, liquid crystal display, light-emitting diode display, or the like. In such embodiments, the parallel processing subsystem 312 incorporates circuitry optimized for graphics and video processing, including, for example, video output circuitry. Such circuitry may be incorporated across one or more parallel processing units (PPUs) included within the parallel processing subsystem 312. In other embodiments, the parallel processing subsystem 312 incorporates circuitry optimized for general purpose and/or compute processing. Again, such circuitry may be incorporated across one or more PPUs included within the parallel processing subsystem 312 that are configured to perform such general purpose and/or compute operations. In yet other embodiments, the one or more PPUs included within the parallel processing subsystem 312 may be configured to perform graphics processing, general purpose processing, and compute processing operations. The system memory 104 includes at least one device driver 103 configured to manage the processing operations of the one or more PPUs within the parallel processing subsystem 312.

In various embodiments, the parallel processing subsystem 312 may be integrated with one or more of the other elements of FIG. 3 to form a single system. For example, the parallel processing subsystem 312 may be integrated with the CPU 302 and other connection circuitry on a single chip to form a system on chip (SoC).

It will be appreciated that the system shown herein is illustrative and that variations and modifications are possible. The connection topology, including the number and arrangement of bridges, the number of CPUs, and the number of parallel processing subsystems, may be modified as desired. For example, in some embodiments, the system memory 304 could be connected to CPU 302 directly rather than through memory bridge 305, and other devices would communicate with the system memory 304 via the memory bridge 305 and the CPU 302. In other alternative topologies, the parallel processing subsystem 312 may be connected to the I/O bridge 307 or directly to the CPU 302, rather than to the memory bridge 305. In still other embodiments, the I/O bridge 307 and the memory bridge 305 may be integrated into a single chip instead of existing as one or more discrete devices. Lastly, in certain embodiments, one or more components shown in FIG. 3 may not be present. For example, the switch 316 could be eliminated, and the network adapter 318 and add-in cards 320, 321 would connect directly to the I/O bridge 307.

Illustratively, the data labeling application 104 that runs in the client device 102 is a web application running in a web browser 330. Although shown as a web application for illustrative purposes, the data labeling application 104 may be implemented as a native application or other type of software in alternative embodiments. Further, functionality of the data labeling application 104 may be distributed across multiple pieces of software in some embodiments. As shown, the system memory 316 stores the web browser 330 and an operating system 340 on which the web browser 330 runs. The operating system 340 may be, e.g., Linux® or Microsoft Windows® and includes a graphics driver 342 that implements a graphics API 332 exposed by the web browser 330 for rendering content, via the parallel processing subsystem 312 (and/or the CPU 302). For example, the graphics API 332 could be WebGL (Web Graphics Library), which is a JavaScript API for rendering interactive 3D and 2D graphics within a compatible web browser. In some embodiments, the data labeling application 104 may invoke the graphics API 332 to render 3D point clouds, and the data labeling application 104 may further provide tools that facilitate the labeling of data, according to techniques disclosed herein.

In alternate embodiments, the system 100 may include any number of client devices 102, any number of servers 130, any number of customer devices 110, any number of memories 304, and any number of processors 302 that are implemented in any technically feasible fashion. Further, the client devices 102, the servers 130, the memory 304, and the processor 302 may be implemented via any number of physical resources located in any number of physical locations. For example, the memory 304 and the processor 302 could be implemented in a cloud computing environment or a distributed computing environment that is accessible to the client device 102. The connection topology between the various units in FIGS. 1 and 2 may be modified as desired.

Point Cloud Visualization

Figure 4:
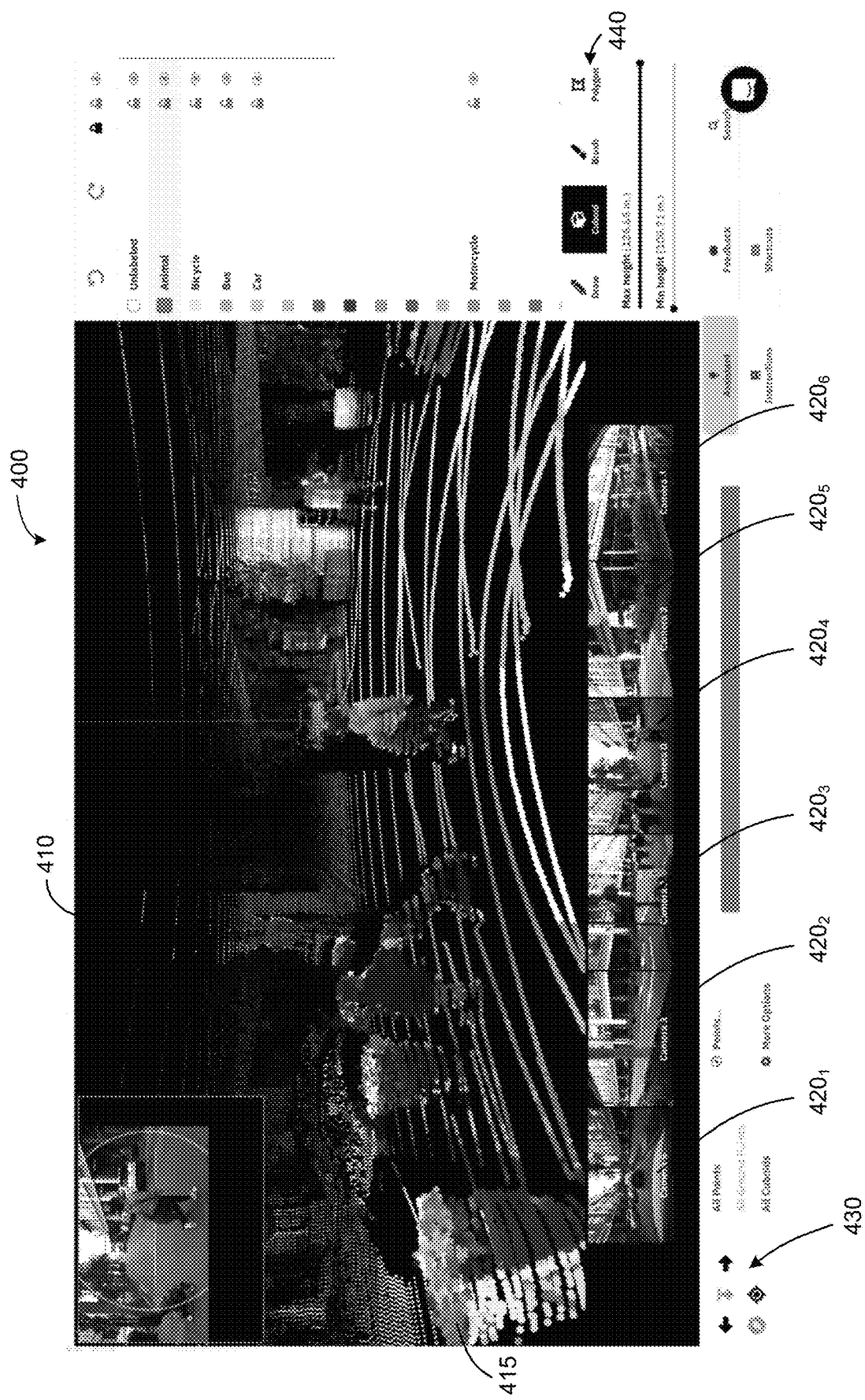
FIG. 4 illustrates an example user interface (UI) displaying a point cloud coloring determined based on photographic data, according to various embodiments.

FIG. 4 illustrates an example user interface 400 displaying a point cloud coloring determined from photographs, according to various embodiments. As shown, the UI 400, which is generated by the data labeling application 104, includes a rendering 410 of a 3D scene, photographs $420_{1-6}$ associated with the rendered scene and captured at the same point in time, navigation controls 430, and labeling tools 440. As shown, the rendering 410 is a rendering of a 3D point cloud with colors derived from the photographs $420_{1-6}$. For example, one or more LIDAR sensors (and/or radar systems) may be mounted on a vehicle to capture information about a 3D environment, and regular digital cameras may also be mounted on the vehicle to capture photographs from different vantage points. Known calibration information, such as the lengths of camera lenses, the positions of the cameras in world space, and the orientations and angles of the cameras, may be used to determine the locations at which points in the 3D world space would appear in the captured photographs, based on which colors may be derived for those points, as discussed in greater detail below. Although discussed herein primarily with respect to point cloud colorings determined based on photographic data, label data, and/or LIDAR intensity data, in some embodiments the default point cloud coloring may be no color, or a custom color (e.g., green for ground points). In addition, some embodiments may permit a user to select point cloud colorings based on the relative height of points.

The navigation controls 430 permit a user to rotate (e.g., by 90 degrees with each press of the left or right arrows, or to see a bird's eye view with a press on the downward arrow) the rendering 410, such that the point cloud can be viewed from different perspectives. The navigation controls 430 further permit the user to follow an object, such as a self-driving vehicle from which the photographs $420_{1-6}$ and 3D point cloud data were captured, by pressing on the compass icon, or to follow a selection by pressing on the target icon. The user may also navigate freely within a 3D scene using, e.g., the w, a, s, and d keys on a keyboard or navigation controls provided via the UI 400, as well as zoom in and out using, e.g., a mouse scroll wheel or a trackpad. Further, the user interface 400 may also provide a visualization slider and shade points by depth, density, and local occlusion, which is a form of synthetic lighting that gives the points 3D structure that may help users to disambiguate what they see from different perspectives after the users move away from the origin. Otherwise, it may be unclear at other angles the orientation of points in 3D space, as some sides of objects may be occluded and not represented by points in the point cloud. For example, based on the depths of pixels in the rendering 410, the data labeling application 104 could perform a convolution for each pixel that takes the differences in depth of the pixel and its neighboring pixels, thereby distinguishing points that are closer to each other and further away, and adds a shading element to the pixel based on such differences. In addition, the UI 400 permits users to navigate through time to view renderings of frames associated with different points in time. This assumes that the data labeling application 104 receives 3D data (e.g., LIDAR data) as a series of point clouds, also referred to herein as a "video," with each of the point clouds corresponding to a respective time stamp. For example, the 3D data could be a video at 5 Hz, which would include five frames per second, any of which the user may select to view. In some embodiments, the UI 400 may also permit a user to view point clouds from multiple frames simultaneously by superimposing the frames on top of each other, rather than requiring the user to step through the frames one by one. Doing so may help the user to visualize trajectories of objects (and assigned labels) over time.

After navigating to a desired view (and time), the user may tag points as belonging to particular types of objects, draw annotations in the form of cuboids, or otherwise label data in the 3D scene using the labeling tools 440 provided by the data labeling application 104. Illustratively, the labeling tools 440 include a polygon tool, a draw tool, and a brush tool, that can be used to select points for labeling. The polygon and draw tools permit the user to draw polygons and arbitrary selection shapes, respectively, while the brush tool permits free-form labeling of points using a brush of a user-specified size. Further, the labeling tools 440 include a cuboid tool for selecting points within cuboids and adding cuboid annotations.

In some embodiments, the data labeling application 104 generates the rendering 410 of the point cloud by obtaining an aggregated point cloud from LIDAR data with down sampling, determining the colors and sizes of points in the aggregated point cloud, and rendering the aggregated point cloud with the determined coloring and sizes, as discussed in greater detail below. Illustratively, coloring has been determined for the point cloud in the rendering 410 using the associated photographs $420_{1-6}$. In some embodiments, the data labeling application 104 may determine such a photo-based point cloud coloring by identifying one of the photographs $420_{1-6}$ that is taken by a camera closest to each point, computing a homography to map the point to a location within the identified photograph, and determining a color for the point using a bilinear filter that takes a weighted average of the colors of multiple (e.g., four) pixels that are closest to the mapped location, based on their respective positions relative to the mapped location. The homography may include solving a linear system to locate the 3D point within the 2D photograph selected for that point given known calibration information such as the length of a camera lens, the position of the camera in 3D world space, and the orientation and angle of the camera. However, it should be understood that such a homography may only produce an approximate location of the 3D point within the 2D photograph, as there may be some precision error when the 3D point is mapped to a location in the grid of pixels making up the 2D photograph. The data labeling application 104 corrects for such an approximation by applying the bilinear filter that takes a weighted average of a number of closest pixels in the image to the approximate location.

As shown, a point 415 has been colored red, as the photograph $420_4$ was captured by a camera closest to the point 415, and the point 415 maps to a location where red flowers are depicted in the photograph $420_4$. As a result, the data labeling application 104 may apply a bilinear filter that averages a number of (e.g., four) red pixels that are closest to the location in the photograph $420_4$ to which the point 415 mapped, producing a red coloring for the point 415.

In other embodiments, the data labeling application 104 may select one of the photographs $420_{1-6}$ based on the oblique angle that a line to the point makes with respect to cameras that captured the photographs $420_{1-6}$, rather than based on distance to a viewer. In particular, the data labeling application 104 may prefer a camera that captures the point from straight on, as opposed to at a low angle. It should be understood that distance to the camera may be used as a proxy for such a camera that captures the point from straight on. In some embodiments, the data labeling application 104 may also account for relative luminances of the photographs $420_{1-6}$ when selecting one such photograph to use in determining a point coloring. For example, assume the luminances of photographs captured by multiple cameras, as indicated by the distributions of respective histograms of sub-region luminances (discussed in greater detail below) within such photographs or a global histogram that is a union of such histograms, differ from the luminance of a photograph captured by another camera, as indicated by another histogram of sub-region luminances within the photograph. In such a case, the data labeling application 104 may select one of the photographs that is not captured by the outlier camera or decrease a priority of the outlier camera, which could be affected by, e.g., sunlight shining directly into it. As another example, if the luminances of photographs captured a camera at multiple points in time differ from the luminance of a photograph captured by that camera at another time, the data labeling application 104 may select not to use the outlier photograph.

In some embodiments, the data labeling application 104 may also determine, based on the photographs $420_{1-6}$, default color properties (which may later be adjusted by a user) to apply to the point cloud coloring, such as default levels of brightness, contrast, exposure, and/or a night vision mode. As used herein, "exposure" refers to a gamma correction, and "night vision mode" refers to a solarization that selectively inverts colors based on a threshold. As discussed in greater detail below, in some embodiments, the data labeling application 104 may determine default color properties based on statistics calculated for a global histogram of relative luminances in sub-regions of the photographs $420_{1-6}$ and dominant colors determined via clustering of the colors in the photographs $420_{1-6}$.

In particular, the data labeling application 104 may subdivide each of the photographs $420_{1-6}$ into multiple square regions (e.g., 5×5 or 10×10 pixel regions) and compute the relative luminance, which indicates the human-perceptible brightness, in each of the regions. Doing so essentially quantizes the photographs $420_{1-6}$ into regions that are averaged, and the data labeling application 104 further creates a global histogram that is a union of histograms of the relative luminances in sub-regions of all six photographs $420_{1-6}$. That is, the data labeling application 104 determines a combined perceived brightness histogram of subregions of all photographs in a frame. It should be understood that such a histogram provides an overall distribution of relative luminance within the scene captured in the photographs $420_{1-6}$. In addition, the data labeling application 104 may determine dominant colors within the photographs $420_{1-6}$ via clustering by, e.g., taking the centroids of clusters in the RGB (red, green, blue) color space of the photographs $420_{1-6}$ as dominant colors. For example, to determine dominant colors, the data labeling application 104 could take the centroid of values in the RGB space of subregions of each the photographs $420_{1-6}$ and then apply k-means++ clustering to the union of these centroids, before taking the centroids of the new clusters. Having determined the global histogram of relative luminances and the dominant colors, the data labeling application 104 may further determine statistics such as the skewness, summary statistics, and/or kurtosis of the histogram, which together with the dominant colors may be indicative of low light, inclement weather, or other conditions that should be corrected for. The data labeling application 104 then determines color properties to apply based on the determined histogram statistics, the dominant colors, and predefined heuristics that permit the data labeling application 104 to classify frames as "dark," "light," etc. and adjust settings automatically. For example, the heuristics may include a rule specifying that the data labeling application 104 should reduce the exposure level if particular skewness, summary statistics, kurtosis, and/or dominant color values are observed, indicating that the photographs $420_{1-6}$ are overexposed (i.e., too bright), or vice versa. In alternative embodiments, the data labeling application 104 may begin with a desired histogram and determine settings for color properties that would transform statistics of the global histogram created from the photographs $420_{1-6}$ to match statistics of the desired histogram. In some embodiments, the data labeling application 104 may also catalog scenes based on visual characteristics, and correlate the visual characteristics with other quality data to determine values for automatic presets. For example, dark scenes could be grouped together, and the data labeling application 104 could determine that labelers who performed well on dark scenes used particular settings, after which the data labeling application 104 could automatically apply those same settings as the default for dark scenes.

In some embodiments, color property adjustments may be made by the data labeling application 104 in a predefined order. Ordering matters, as color property adjustments made in different orders to an image can produce different results. For example, changing the contrast of an image and then applying an exposure correction could be different from applying the same exposure correction prior to changing the contrast by the same amount. In a particular embodiment, the ordering may be base color (usually white, but configurable), height gradient linearly mixed in, photographic colors linearly mixed in, solarization/night vision effect colors linearly mixed in, contrast effect colors linearly mixed in, exposure/gamma correction exponentially applied, segmentation label colors linearly mixed in, brightness effect linearly scaled in, intensity effect linearly scaled in, and depth/local occlusion shading (described above). Linear mixing may multiplying a base color being by a blend color and adding the result on top of an existing color, which is akin to highlighting. The different effects may be modified by user specified amounts, such as between 0 and 100 percent, with 0 percent represents no effect and 100 percent representing the full effect.

Figure 5:
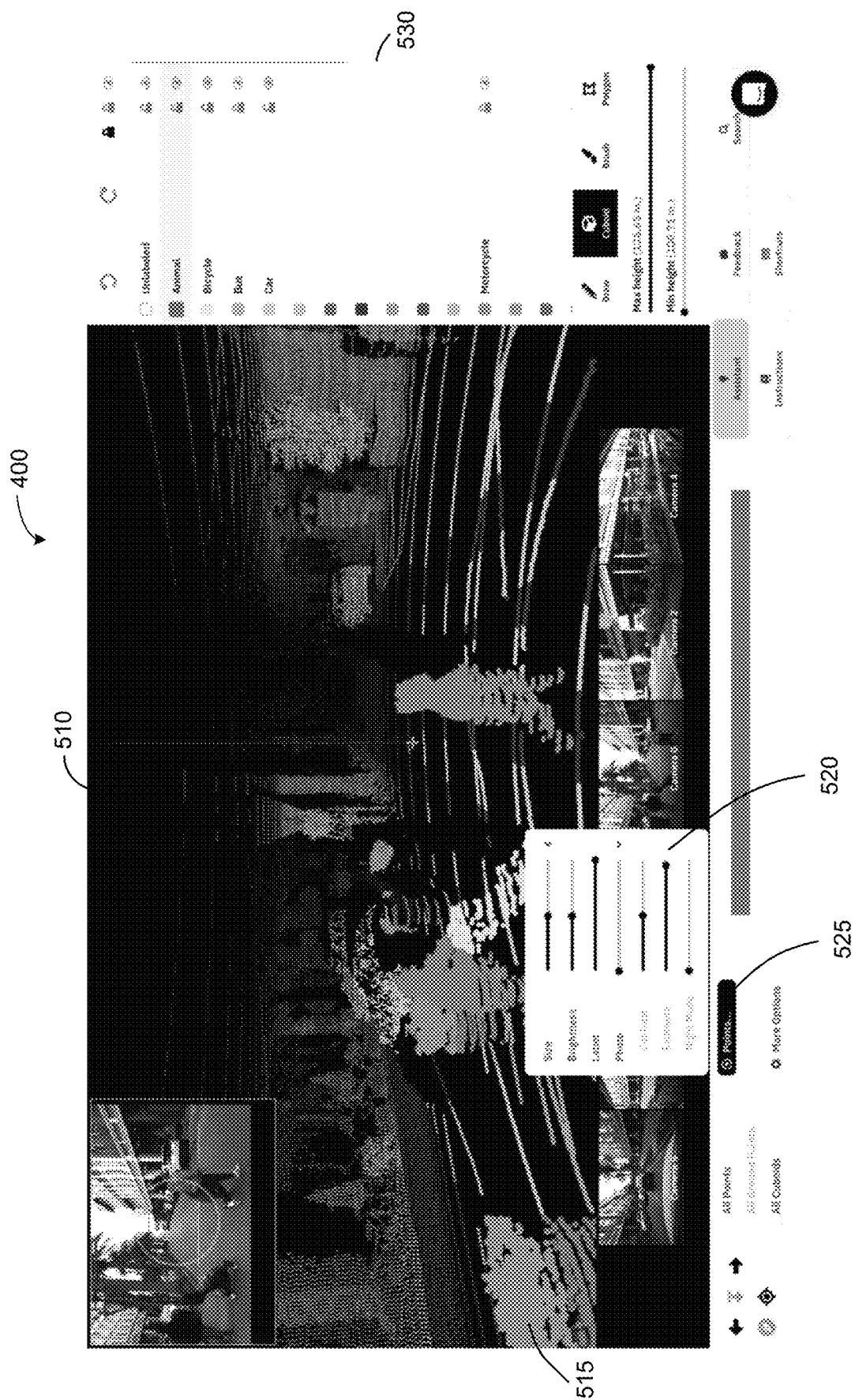
FIG. 5 illustrates an example UI displaying a point cloud coloring determined based on labels assigned to points, according to various embodiments.

FIG. 5 illustrates the example user interface 400 of FIG. 4, but displaying a point cloud coloring determined based on labels assigned to points, according to various embodiments. The example of FIG. 5 assumes that a user has tagged, via the data labeling application 104, points with labels indicating types of objects to which those points belongs. As described, other types of labeling, such as cuboid annotations, may be used in some cases. As shown in FIG. 5, pedestrians, cars, buildings, vegetation, animals, bicycles, buses, motorcycles, road markings, etc. have been tagged by the user with the appropriate labels. Based on such a labeling, the data labeling application 104 determines a point cloud coloring for the rendering 510 of the 3D scene by applying a distinct color to points associated with each such label. For example, point 515 is colored light pink to indicate that the point 515 has been assigned the "vegetation" label. Other points associated with pedestrians, cars, buildings, etc. are colored with different colors, as indicated in a key 530 shown via the UI 400.

As shown, the UI 400 further includes a panel 520 that is displayed in response to user selection of a "points" button 525. The panel 520 includes a number of sliders for adjusting the sizes of rendered points, how point cloud colorings determined from photographic and label data are blended together in the rendering 510, and various color properties. Although shown as a pop-up panel including sliders for illustrative purposes, functionality of the panel 520 and sliders therein may be exposed via any suitable UI element or elements in other embodiments. In the illustrated panel 520, "photo" and "label" sliders permit a user to select a blending of point colors derived based on labels assigned to points in the point cloud with point colors derived based on the photographs $420_{1-6}$, respectively, which are essentially two different "layers" of colors whose opacity can be adjusted via the "photo" and "label" sliders. In addition, the panel 520 provides sliders for adjusting color properties such as brightness, contrast, exposure (i.e., gamma correction), or a night vision mode. As described above with respect to FIG. 4, initial values for such color properties may be determined automatically based on statistics calculated for a histogram of luminances in sub-regions of the photographs $420_{1-6}$ and dominant colors determined from the photographs $420_{1-6}$. The sliders in the panel 520 permit a user to change such automatically-determined color property values. Illustratively, as described above, the effects may be applied in a predefined order in some embodiments.

Illustratively, the user has selected, via the "photo" and "label" sliders, to make the label point cloud coloring visible and the photo point cloud coloring invisible. As a result, the rendering 510 of the 3D scene includes pixels colors reflecting solely the colors determined based on the labels assigned to points in the point cloud and not the photographs $420_{1-6}$. This is in contrast to the rendering 410 of the 3D scene in FIG. 4, where a user selected to make the photo point cloud coloring visible and the label point cloud coloring invisible, such that the rendering 410 includes pixel colors reflecting solely the colors determined from the photographs $420_{1-6}$ and not the labels assigned to points. If the user were to select partial visibility of the label or the photo point cloud colorings, then the data labeling application 104 would blend the point colors determined from the photographs $420_{1-6}$ and from the assigned labels, based on the user selection. Any suitable blending technique(s), such as linear mixing in which the base color is multiplied by the blend color and added on top of the existing color, may be used to blend the label and photo point cloud colorings. By adjusting how the label and photo point cloud colorings are blended via sliders in the panel 520, a user can identify whether labels assigned to points in the point cloud are accurate. For example, if the point 515 is light pink when the label point cloud coloring is made visible, indicating that the point 515 is associated with vegetation, but the point 515 is the same color as surrounding pavement when the photo point cloud coloring is made visible, then it can be determined that the point 515 has been mislabeled.

Figure 6:
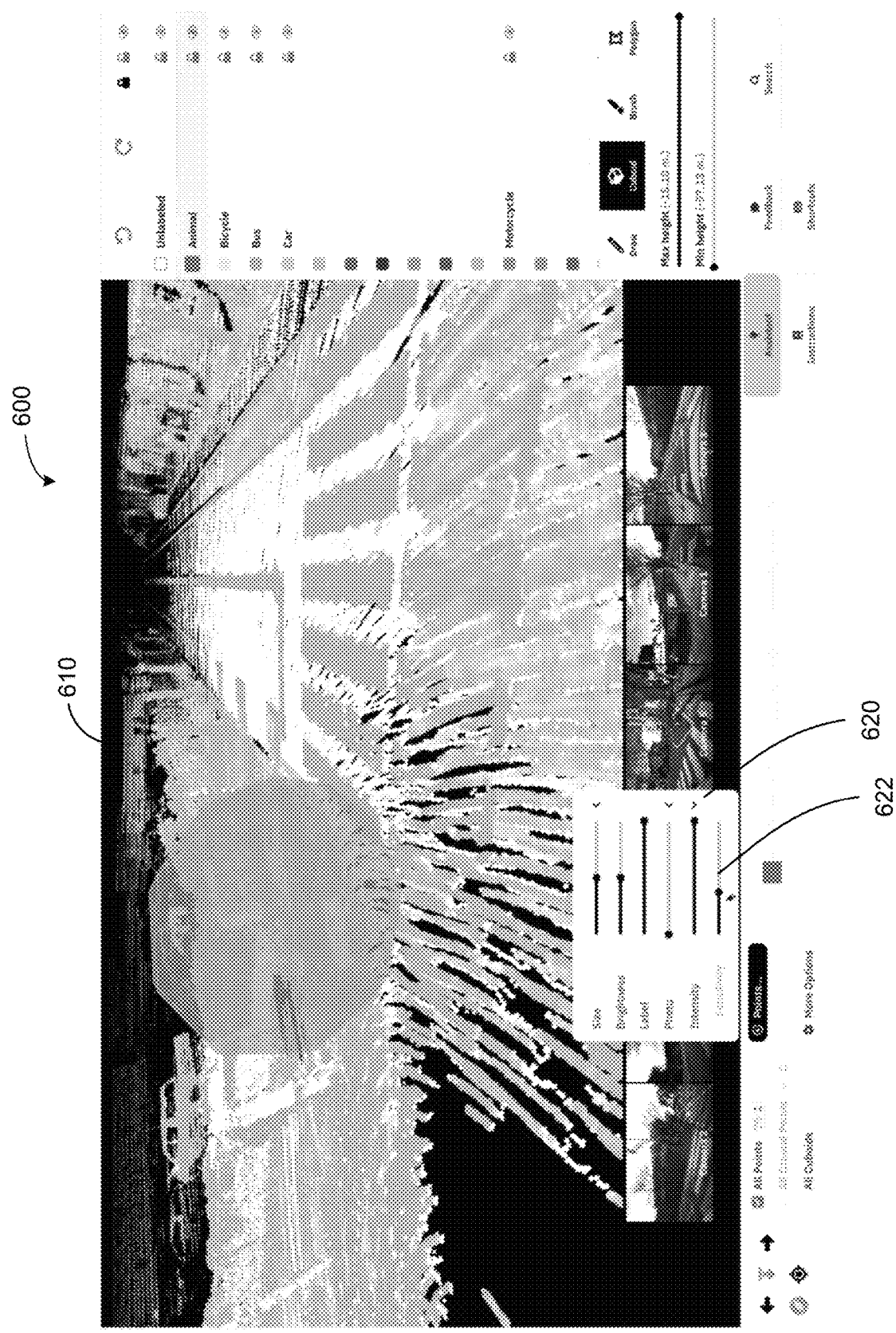
FIG. 6 illustrates an example UI displaying a point cloud coloring determined based on label and light detection and ranging (LIDAR) intensity data, according to various embodiments.

FIG. 6 illustrates an example user interface 600 displaying a point cloud coloring determined based on label and LIDAR intensity data, according to various embodiments. As used herein, "LIDAR intensity" refers to the strength of laser light reflected back to a LIDAR sensor (as opposed to diffused), and intensity information may be collected by the LIDAR sensor for each point and laser pulse that generated the point. It should be understood that different materials may exhibit different reflectance properties. For example, asphalt and the paint from lane markings generally reflect light differently. As a result, different materials such as asphalt and paint can be inferred from LIDAR intensity data.

As shown, a rendering 610 in which a point cloud coloring is determined from LIDAR intensity data highlights certain materials in the scene, such as paint on the roads corresponding to lane markings and crosswalks. Doing so may help a user label objects comprising such materials and/or verify the accuracy of prior labeling. In addition, use of LIDAR intensity data can help mitigate calibration errors that might affect the point cloud colorings determined from photographic data, described above, as the LIDAR intensity data is part of the LIDAR data itself.

In some embodiments, the data labeling application 104 may determine a point cloud coloring from LIDAR intensity data by parameterizing an activation function that controls the colors assigned to different intensity values based on a distribution of intensity values in a 3D scene and a user-configurable sensitivity, which as shown can be adjusted via a sensitivity slider 622 in a panel 620, according to techniques disclosed in the patent application entitled "LIDAR INTENSITY VISUALIZATION" Ser. No. 16/518,820. As used herein, an "activation function" is a type of function that defines an output given an input and activates its effect beginning at a certain threshold. The effect may be activated over an activation window after the threshold. Examples of activation functions include the sigmoid function, the arc-tangent function, and the hyperbolic-tangent function.

As shown, the user has selected via the panel 620 of the UI 600 to make the LIDAR intensity and the label point cloud colorings visible, but the photo point cloud coloring invisible. In response, the data labeling application 104 generates the rendering 610 of the 3D scene by blending the LIDAR intensity and label point cloud colorings. As described, any suitable blending technique(s), such as the linear mixing, may be employed by the data labeling application 104, and the effects may be applied in a predefined order. In this example, no label coloring is visible, as labels have not yet been assigned to points in the point cloud, and the default is for points to be unlabeled.

Figure 7:
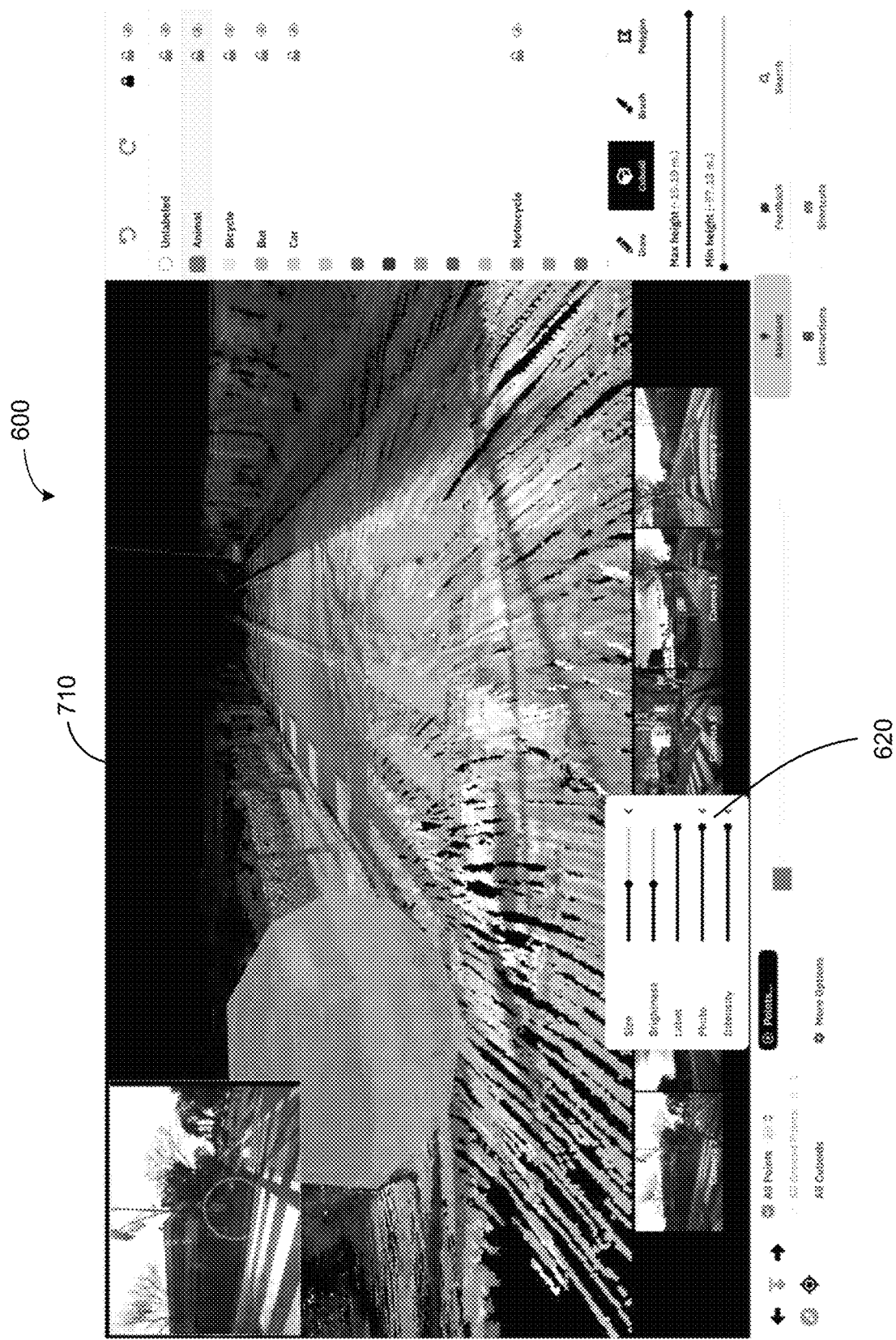
FIG. 7 illustrates an example UI displaying a point cloud coloring determined based on photographic, label, and LIDAR intensity data, according to various embodiments.

FIG. 7 illustrates the example user interface 600, but displaying a point cloud coloring determined based on photographic, label, and LIDAR intensity data, according to various embodiments. As shown, a rendering 710 included in the UI 600 is generated by blending the point cloud colorings determined based the on photographic, label, and LIDAR intensity data, according to a user selection made via sliders in the panel 620. Similar to the rendering 610 discussed above with respect to FIG. 6, the rendering 710 highlights in yellow certain materials in the scene, such as paint on the roads corresponding to lane markings and crosswalks. In addition, the rendering 710 includes colors from the photographs $420_{1-6}$ for points that are not highlighted, which may include points for which the activation function threshold described above has not been met.

Figure 8:
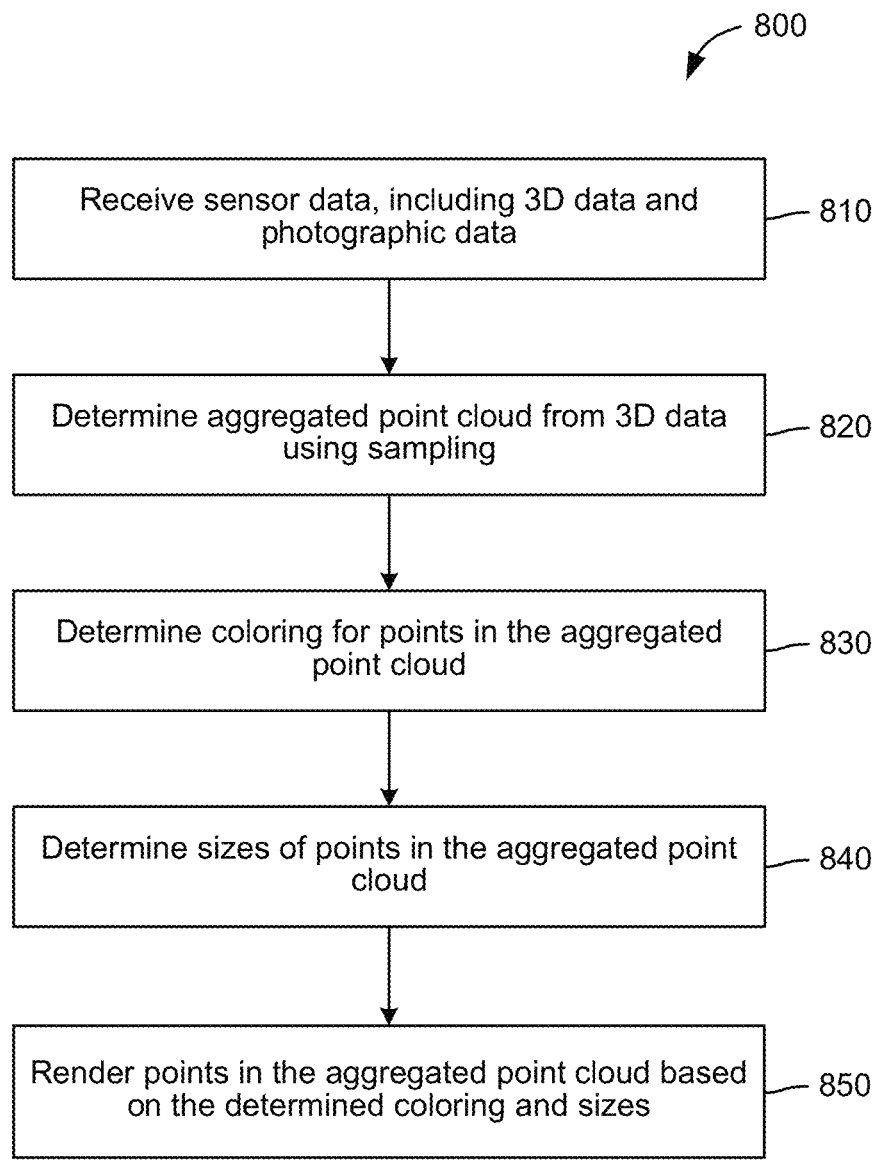
FIG. 8 is a flow diagram of method steps for visualizing data, according to various embodiments.
Figure 9:
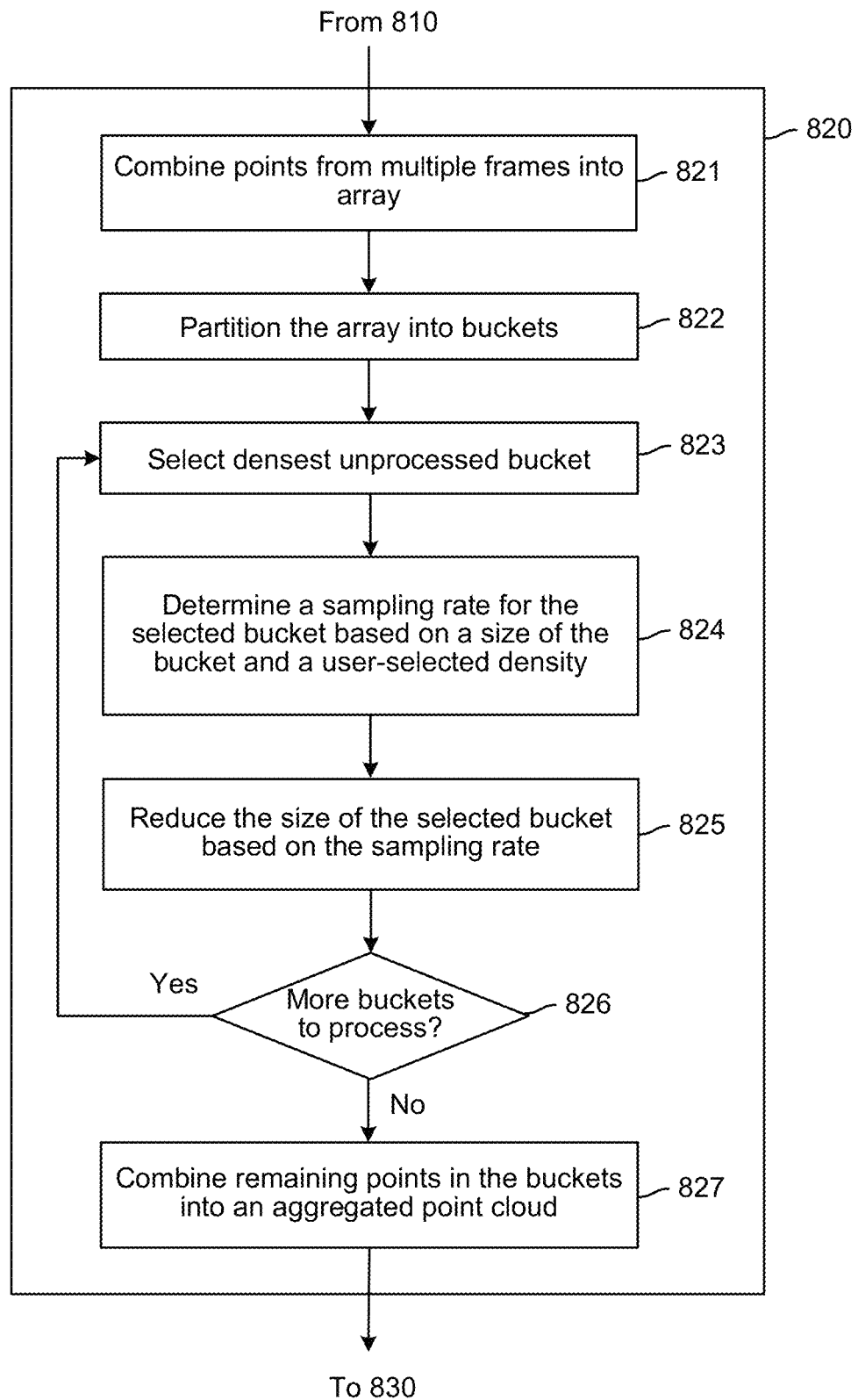
FIG. 9 illustrates in greater detail one of the steps of the method of FIG. 8, according to various embodiments.

FIG. 8 is a flow diagram of method steps for visualizing data, according to various embodiments. Although the method steps are described with reference to the system of FIGS. 1 and 3, persons skilled in the art will understand that any system may be configured to implement the method steps, in any order, in other embodiments.

As shown, a method 800 begins at step 810, where a data labeling application 104 receives sensor data that includes 3D data and photographic data. The 3D data may include data collected by LIDAR, radar, and/or other sensors, in the form of, e.g., point cloud data, or 3D data derived from such collected data. In some embodiments, the received data may include processed data that is sent by the server application 134 to the data labeling application 104 via a network, as described above with respect to FIGS. 1-2.

At step 820, the data labeling application 104 determines an aggregated point cloud from 3D data using sampling. Such sampling may improve the frame rate, which can be low if too many points are being rendered per frame. FIG. 8 illustrates the determination of an aggregated point cloud using sampling at step 820 in greater detail, according to various embodiments. Although shown for illustrative purposes as being determined by the data labeling application 104, in other embodiments the aggregated point cloud may be precomputed on the server side by, e.g., the server application 134, and then sent to the data labeling application 104.

As shown, at step 821, the data labeling application 104 combines points from multiple frames (e.g., all frames) into an array. As described, 3D data may be received as a series of point clouds, i.e., a "video," with each of the point clouds corresponding to a respective time stamp, and such a video may be rendered as a series of frames including respective point clouds. The data labeling application 104 constructs an array that includes points from multiple such frames at step 821. For example, the data labeling application 104 could combine all of the points from all of the frames into the array, after which the data labeling application 104 may choose a subset of those points via sampling. In such a case, each point could remain associated with the frame it came from so that a photo coloring for that point may be determined based a photograph associated with that frame. It should be understood, then, that the coloring for points may be determined from different photographs and different frames. Further, in the aggregated point cloud mode, navigating through time may include moving with the LIDAR, radar, and/or other sensors, with points attenuated based on their distance from those sensors, as discussed in greater detail below.

At step 822, the data labeling application 104 partitions (i.e., divides) the array into buckets. For example, in some embodiments, the data labeling application 104 may partition the array into buckets using a spatial hash that projects the 3D domain space into a 1D hash table.

At step 823, the data labeling application 104 processes the buckets in turn, selecting first a (unprocessed) bucket that includes the most points, which is also referred to herein as the densest bucket or the bucket that is biggest in size. Although the buckets are shown as being processed sequentially for illustrative purposes, the data labeling application 104 may process multiple buckets in parallel in alternative embodiments.

At step 824, the data labeling application 104 determines a sampling rate for the selected bucket based on a size of (i.e., the number of points within) the bucket and a user-selected density. In some embodiments, an overall density, specifying how much the aggregated point cloud is to be down sampled, is a user configurable parameter. In such a case, the data labeling application 104 may perform down sampling according to a user-specified density. For example, the user could select between a high-density aggregated point cloud with lesser sampling and a low-density aggregated point cloud with more sampling. As another example, assume that the user selects a low-density aggregated point cloud in which the number of points within each bucket is reduced to at most 20, and the number of points within a particular bucket is 1000. In such a case, the data labeling application 104 may sample the 1000 points down to 20.

In other embodiments, the sampling may not reduce all of the buckets based on the same overall density. For example, in some embodiments, the sampling may attempt to preserve order, such that if one bucket starts with more points than another bucket, then that bucket still has more points after sampling. As another example, the data labeling application 104 could perform sampling based on the buckets that correspond to spatial grid cells that a user is looking at. In such a case, the data labeling application 104 may use an activation function to determine a maximum number of points per bucket based on how far a grid cell corresponding to the bucket is from the viewer.

In further embodiments, the data labeling application 104 may take into account not only spatial density but also photographic and/or LIDAR data when the data labeling application 104 performs down sampling. For example, in some embodiments, the data labeling application 104 may use normal map data, which includes an approximated normal vector for each point and can be derived from LIDAR data, to disambiguate points that are clustered together based on materials to which those points belong, and then down sample in a manner that does not discard too many points belonging to any such material. As a result, when down sampling a number of points that are clustered together spatially but belong to different materials (e.g., asphalt and metal), the data labeling application 104 may do so while preserving the integrity of each of the materials. As used herein, the "normal vector" for a point is a vector indicating a direction orthogonal to a surface represented by the point, and multiple normal vectors may be included in a normal map. Normal vectors may be used to discern contiguous regions of materials, as different materials may have different patterns of normal vectors along their surfaces, resulting from the different textures of those materials. As another example, in some embodiments, the data labeling application 104 may discern between different materials using LIDAR intensity data, as described above, and then down sample in a manner that does not discard too many points belonging to any identified material. In some embodiments, normal vectors and/or LIDAR intensity may also be used, a posteriori, to correct camera calibrations, which as described is important for obtaining accurate point color colorings from photographic data.

At step 825, the data labeling application 104 reduces the size of the selected bucket based on the sampling rate. In some embodiments, the data labeling application 104 may use random sampling to reduce the bucket size. Returning to the example of sampling 1000 points down to 20 points, the data labeling application 104 could, e.g., shuffle the 1000 points and take the first 20 points, while discarding the remaining points.

At step 826, if there are more buckets to process, then the method 800 returns to step 823, where the data labeling application 104 again selects a densest bucket that has not yet been processed. Otherwise, the method 800 continues to step 827, where the data labeling application 104 combines the remaining points in the buckets together as the aggregated point cloud.

Figure 10:
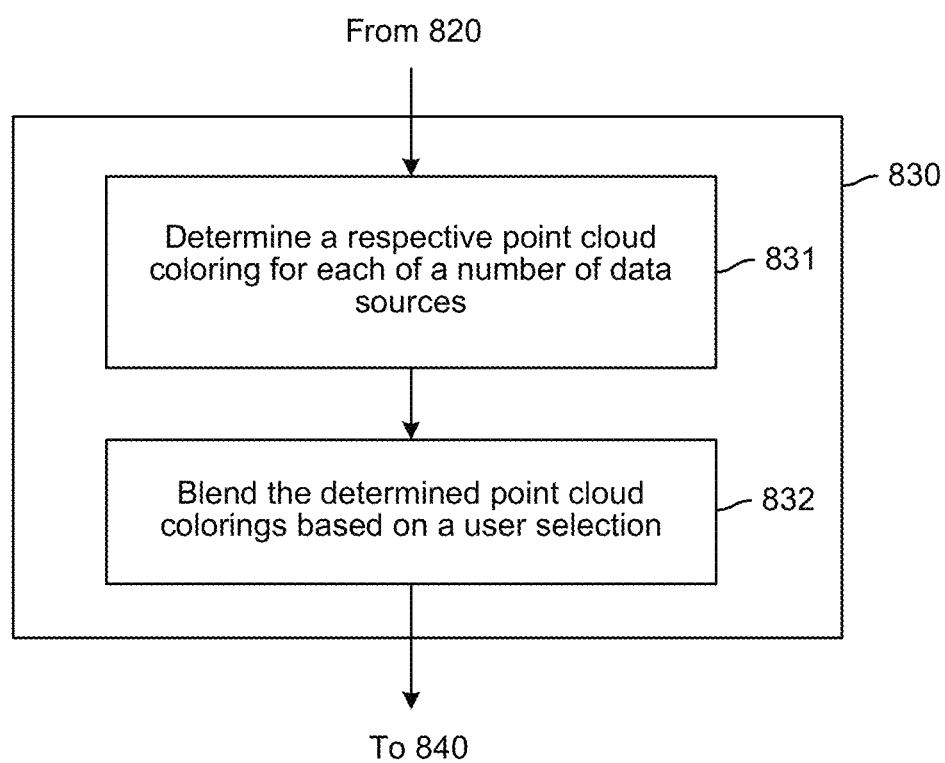
FIG. 10 illustrates in greater detail another of the steps of the method of FIG. 8, according to various embodiments.

Returning to FIG. 8, at step 830, the data labeling application 104 determines colors for points in the aggregated point cloud. FIG. 10 illustrates determining the coloring at step 830 in greater detail, according to various embodiments. As shown, at step 831, the data labeling application 104 determines a respective point cloud coloring for each of a number of data sources. For example, in some embodiments, one point cloud coloring may be determined from photographs corresponding to the point cloud, a second point cloud coloring may be determined from labels assigned to points in the point cloud, and a third point cloud coloring may be determined from LIDAR intensity data, as described above with respect to FIGS. 4-7. As described, a point cloud coloring may be determined from LIDAR intensity data by, e.g., parameterizing an activation function that controls the colors assigned to different intensities based on a distribution of intensity values in the scene and a user-configurable sensitivity.

Figure 11:
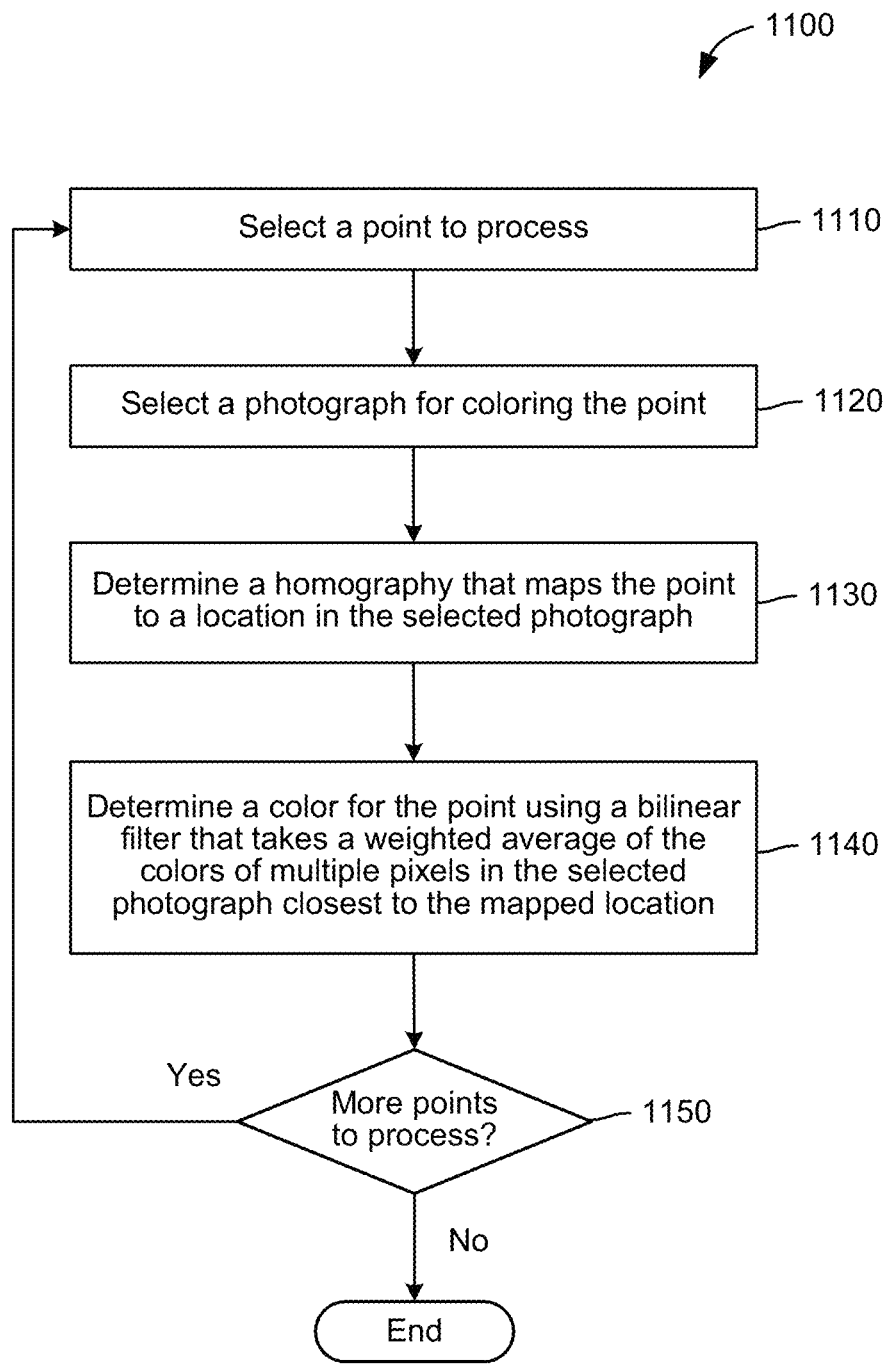
FIG. 11 is a flow diagram of method steps for determining a point cloud coloring from photographic data, according to various embodiments.

FIG. 11 is a flow diagram of method steps for determining a point cloud coloring from photographic data, according to various embodiments. Although the method steps are described with reference to the system of FIGS. 1 and 3, persons skilled in the art will understand that any system may be configured to implement the method steps, in any order, in other embodiments.

As shown, a method 1100 begins at step 1110, where the data labeling application 104 selects a point that has not yet been processed. Although points are shown as being processed sequentially for illustrative purposes, the data labeling application 104 may process multiple points in parallel in alternative embodiments.

At step 1120, the data labeling application 104 selects a photograph to use for coloring the point. It is assumed that multiple photographs are captured by respective cameras for each frame. As described, the point may be one of a number of points that remains after the points from multiple frames were combined together and down-sampled, but the point may remain associated with the frame it came from so that a photo coloring for the point may be determined from one of the photographs of the associated frame. In such a case, the data labeling application 104 may select the particular photograph to use based on predefined criteria. For example, in some embodiments, the criteria may specify that a photograph captured by one of the cameras that is closest in distance to the point should be selected. In other embodiments, the criteria may specify that a photograph should be selected based on the oblique angles that a line to the point makes with respect to the cameras, with a photograph captured from straight on being preferred. In some embodiments, the criteria may also exclude or de-prioritize outliers such as photographs in which a relative luminance differs from the luminance of other photographs captured by other cameras or the same camera at different times, as described above with respect to FIG. 4.

At step 1130, the data labeling application 104 determines a homography that maps the point to a location in the selected photograph. Such a homography is well-known and may include solving a linear system in some embodiments.

At step 1130, the data labeling application 104 determines a color for the point using a bilinear filter that takes a weighted average of the colors of multiple pixels in the selected photograph that are closest to the mapped location. For example, in some embodiments, the data labeling application 104 may take a weighted average of the colors of four closest pixels based on the distances of those points to the mapped location.

If, at step 1140, there are more points to process, then the method 1100 returns to step 1110, where the data labeling application 104 selects another point to process. On the other hand, if there are no more points to process, then the method 1100 terminates.

Figure 12:
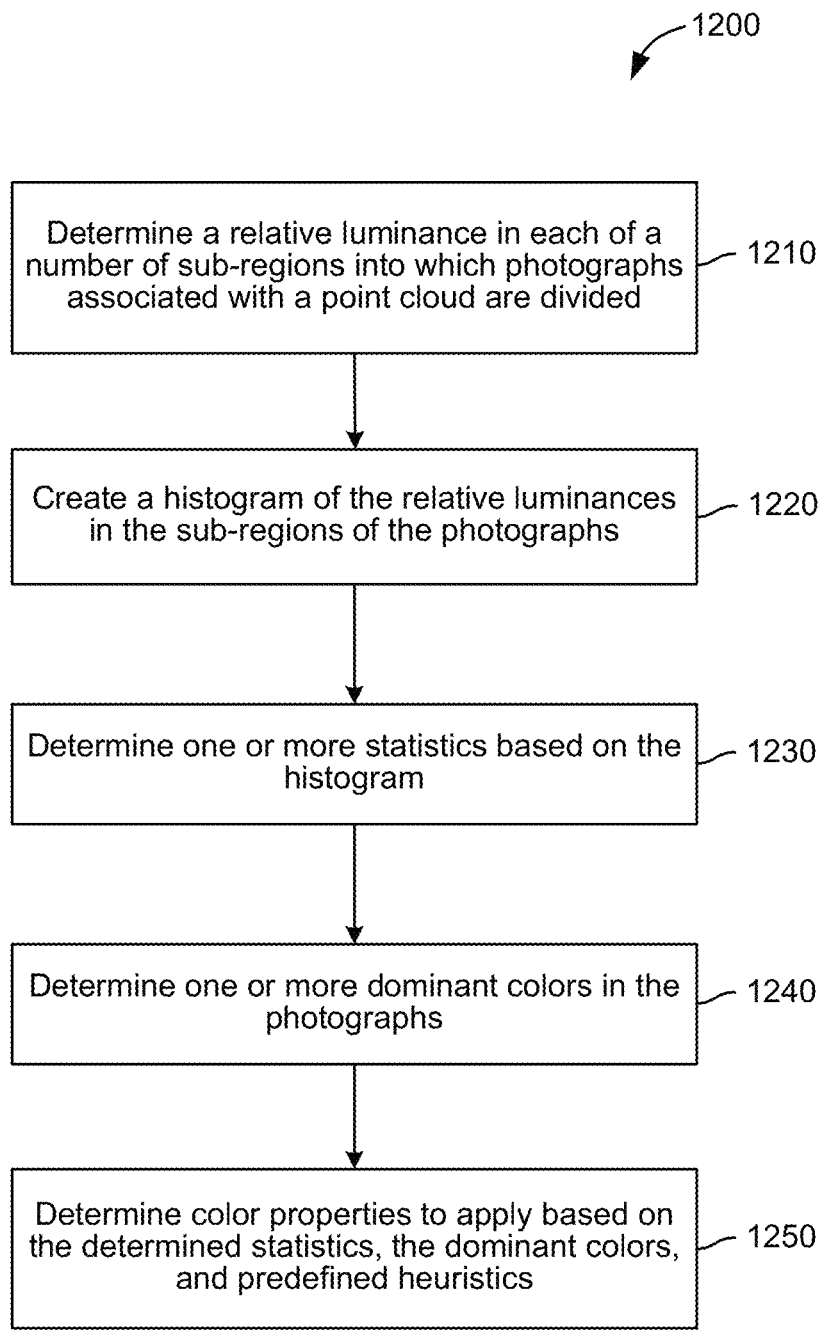
FIG. 12 is a flow diagram of method steps for determining color properties of a point cloud coloring, according to various embodiments.

In addition to determining colors from photographic data, the data labeling application 104 may determine color properties, such as default levels of brightness, contrast, exposure, or a night vision mode to apply to the point cloud coloring determined based on photographic data. FIG. 12 is a flow diagram of method steps for determining such color properties to apply to a point cloud coloring, according to various embodiments. Although the method steps are described with reference to the system of FIGS. 1 and 3, persons skilled in the art will understand that any system may be configured to implement the method steps, in any order, in other embodiments.

As shown, a method 1200 begins at step 1210, where the data labeling application 104 determines a relative luminance, which indicates the human-perceptible brightness, in each of a number of sub-regions into which photographs associated with the point cloud are divided. For example, in some embodiments, the sub-regions could be 5×5 or 10×10 pixel regions of the photographs.

At step 1220, the data labeling application 104 creates a histogram of the relative luminances in all of the sub-regions of the photographs. As described, such a histogram provides a distribution of the relative luminances within the photographs.

At step 1230, the data labeling application 104 determines one or more statistics based on the histogram created at step 1230. Examples of such statistics that the data labeling application 104 may determine include skewness, summary statistics, and/or kurtosis.

At step 1240, the data labeling application 104 determines one or more dominant colors from the photographs associated with the point cloud. As described, the data labeling application 104 may determine dominant colors within photographs via clustering in some embodiments. For example, the data labeling application 104 could take centroids of clusters in the RGB color space of the photographs as the dominant colors.

At step 1250, the data labeling application 104 determines color properties to apply based on the determined statistics for the histogram of relative luminances, the dominant colors, and predefined heuristics. As described, the combination of certain values of statistics determined from the histogram of relative luminances and certain dominant colors may be indicative of low light, inclement weather, or other conditions that the data labeling application 104 automatically corrects for. Heuristics may be defined that include rules specifying that the data labeling application 104 should apply a particular color property adjustment if the statistics and/or dominant colors satisfy particular values and/or value thresholds. For example, experiments may show that a particular combination of skewness, summary statistics, kurtosis, and/or dominant color values indicates that a photograph is overexposed, in which case the data labeling application 104 may automatically apply an exposure correction, or vice versa. In alternative embodiments, the data labeling application 104 may begin with a desired histogram and determine color property settings that could be applied to transform statistics of the created histogram to match statistics of the desired histogram.

Returning to FIG. 10, at step 832, the data labeling application 104 blends the point cloud colorings determined from different data sources based on a user selection. Any suitable blending technique(s), such as linear mixing, may be employed, and the user may select a blending of the particular point cloud colorings in any suitable manner. For example, the data labeling application 104 may provide a UI panel that includes sliders via which the user may select a desired blend mode and magnitude, as described above with respect to FIGS. 5-7. Further, the color adjustment operations may performed in a predefined order, as described above with respect to FIG. 4.

At step 840, the data labeling application 104 determines sizes of points in the aggregated point cloud. As described above with respect to FIG. 5, the sizes of points are user-configurable via a slider in the panel 520. However, as the data labeling application 104 renders points in a perspective projection, distant points may generally appear smaller, and the relative density of distant points may also decrease, making it difficult to see points in the distance. In some embodiments, the data labeling application 104 corrects this issue by applying a modifying effect that enlarges, also referred to herein as "scaling," the sizes of points further than a threshold distance from the viewer based on an activation function, with the scaling effect also being user-configurable.

Figure 13:
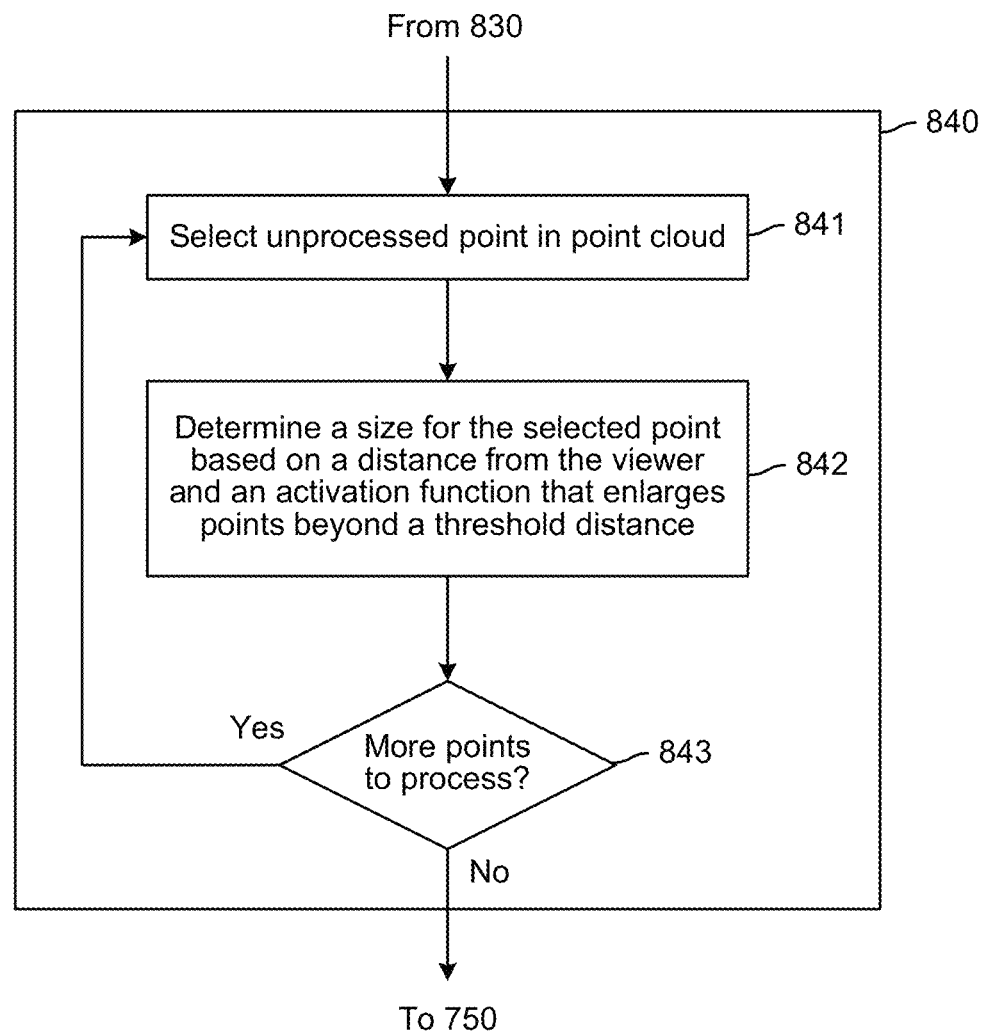
FIG. 13 illustrates in greater detail another of the steps of the method of FIG. 8, according to various embodiments.

FIG. 13 illustrates determining the sizes of point at step 840 in greater detail, according to various embodiments. As shown, the data labeling application 104 iterates through each of the points in the point cloud, selecting a point that has not yet been processed at step 841. Although the processing of points is shown as sequential for illustrative purposes, it should be understood that points may be processed in parallel in alternative embodiments.

At step 842, the data labeling application 104 determines a size for the selected point based on a distance from the viewer and an activation function that enlarges points beyond a threshold distance. Increasing the sizes of points beyond the threshold distance may help "fill in" the background. For example, a building that is far away may appear fuller, as opposed to a sparse set of points, in a rendering of the 3D scene after points associated with the building are enlarged.

In some embodiments, the data labeling application 104 may decrease the sizes of points linearly with increased distance, while enlarging points beyond a distance threshold based on an activation function. For example, a sigmoid function of the form $$\frac{e^{x-10}}{e^{x-10}+1},$$

which is $$\frac{e^x}{e^x+1}$$

shifted by 10 to the left along the x-axis, may be used as the activation function in some embodiments.

Figure 14:
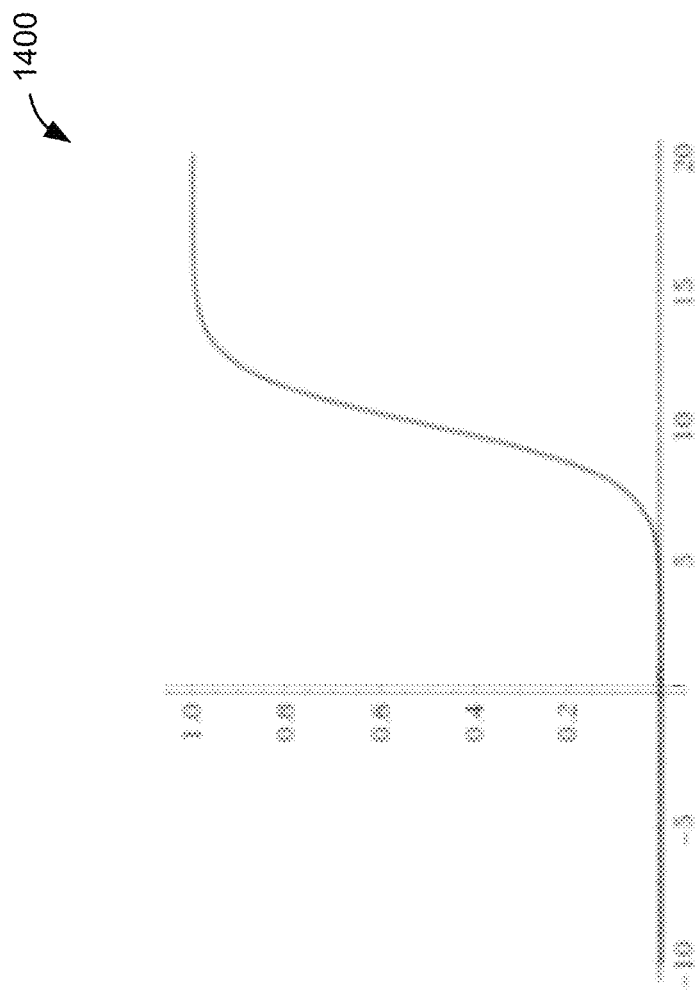
FIG. 14 illustrates a graph showing an example sigmoid function, according to various embodiments.

FIG. 14 illustrates a graph 1400 showing the form of an example sigmoid function that the data labeling application may use to enlarge distant points, according to various embodiments. As shown, all points may be affected by the sigmoid function, but the sigmoid function has very little effect at distances less than a threshold, which is shown as 0 for illustrative purposes but may be a user-configurable distance in embodiments. After zero, the sigmoid function increases monotonically toward a maximum value, shown as 1. The maximum value and/or the rate at which such a maximum value is reached may also be user-configurable in some embodiments. For example, a user could select a threshold distance beyond which points are enlarged up to a maximum of 2.5 to 3 times. In other embodiments, the data labeling application 104 may dynamically determine the maximum amount by which distant points are enlarged based on the sizes of scenes, with points in larger scenes being enlarged more than points in smaller scenes.

Figure 15:
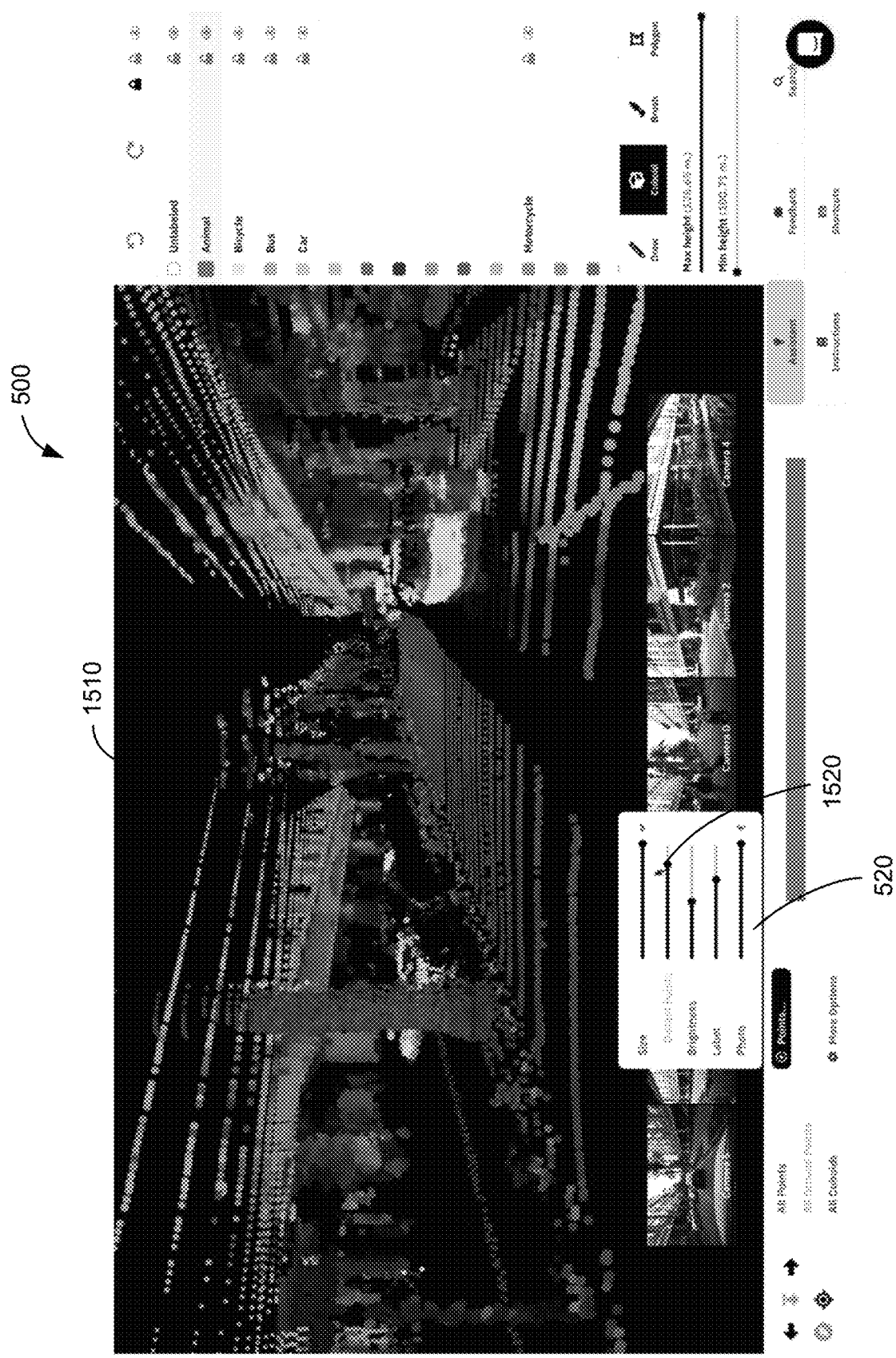
FIG. 15 illustrates an example UI interaction to adjust the amount by which distant points in a point cloud are enlarged, according to various embodiments.

FIG. 15 illustrates an example interaction with the user interface 500 to adjust an amount by which distant points are enlarged, according to various embodiments. As shown, a user has selected to reveal, in the panel 520, a slider 1520 for controlling the sizes of distance points in a rendering 1510 of a 3D scene. In some embodiments, the slider 1520 may permit a user to adjust the maximum amount by which points can be enlarged and/or the rate at point sizes are increased beyond a threshold, as described above. For example, adjusting the slider 1520 could increase the maximum by which points greater than 30 meters away from the viewer are enlarged by up to 2.5 to 3 times in a particular embodiment. In some embodiments, the user interface may also provide control element(s) for adjusting the distance threshold beyond which the activation function takes effect.

Returning to FIG. 13, at step 843, if there are additional points to process, then the method 800 returns to step 841, where the data labeling application 104 selects another point that has not yet been processed. On the other hand, if there are no additional points to process, then the method 800 proceeds to step 850, shown in FIG. 8, where the data labeling application 104 renders the points in the aggregated point cloud based on the determined point cloud coloring and sizes. Is some embodiments, such a rendering may be displayed, via a display device, as part of a user interface that facilitates labeling of data, such as the UI 400 or the UI 600 described above with respect to FIGS. 4 and 6-7, respectively.

In sum, techniques are disclosed for coloring a point cloud based on colors derived from multiple sources, such as photographic, label, and/or LIDAR intensity data, and a user-configurable blending of such colors. When a point cloud coloring is determined based on photographic data in particular, the color for each point within the point cloud may be determined by selecting one of a number of cameras based on a distance from the camera to the point, an oblique angle, and/or a luminance of a photograph captured by the camera (relative to luminances of photographs captured by other cameras or other photographs captured by the same camera); mapping the point to a location in the photograph captured by the camera; and determining a color for the point based on a bilinear filtering of the colors of multiple pixels closest to the mapped location in the photograph. In addition, default values for color properties, such as brightness, contrast, exposure, and/or a night vision mode, may be determined automatically based on statistics calculated for a histogram of luminances in sub-regions of the photographs and dominant colors determined from the photographs. Techniques are also disclosed for generating an aggregated point cloud using a spatial hash and down sampling of each hash bucket based on the number of points therein and a user-configurable density, as well as down sampling that takes into account other data such as photographic and/or LIDAR data, which can be used to distinguish between materials during the sampling process. Further, techniques are disclosed for enlarging the sizes of distant points in a rendered point cloud based on an activation function and a distance threshold.

Advantageously, the disclosed techniques for adjusting the blending of point cloud colorings determined based on data from different sources may facilitate labeling of the point cloud data and/or verification of such labeling. The disclosed techniques for automatically determining color properties based on photographic data may enhance the perceptibility to users of the point cloud. The disclosed techniques for generating an aggregated point cloud with down sampling may improve the frame rate at which a point cloud can be rendered. The disclosed techniques for enlarging the sizes of distant points in a point cloud may improve the visibility of those points in a rendering of the point cloud. These technical advantages represent one or more technological advancements over prior art approaches.

1. Some embodiments include a computer-implemented method for visualizing data, the method comprising displaying, in a first section of a user interface, a rendering of a three-dimensional (3D) scene in which colors are determined based on at least one of photographic data, label data, or light detection and ranging (LIDAR) intensity data, and displaying, in a second section of the user interface, at least one element adjustable to select a blending of the colors determined based on the at least one of photographic data, label data, or LIDAR intensity data.

2. The computer implemented method of clause 1, further comprising displaying, in a third section of the user interface, one or more photographs corresponding to the rendering of the 3D scene.

3. The computer-implemented method of any of clauses 1-2, wherein the rendering of the 3D scene comprises a rendering of a point cloud, and the colors include colors of points in the point cloud determined based on the at least one of photographic data, label data, or LIDAR intensity data.

4. The computer-implemented method of any of clauses 1-3, wherein the colors of points in the point cloud are determined based on the photographic data by performing steps including, for each point within the point cloud, selecting a camera based on at least one of a distance from the camera to the point, an oblique angle, or a relative luminance of a photograph captured by the camera, mapping the point to a location in the photograph captured by the camera, and determining a color for the point based on a weighted average of colors of a plurality of pixels closest to the mapped location in the photograph captured by the camera.

5. The computer-implemented method of any of clauses 1-4, further comprising, applying, to the colors of points in the point cloud, at least one of a brightness, a contrast, an exposure, or a night vision mode correction determined based on statistics calculated for a histogram of luminances in sub-regions of the photographic data, dominant colors determined from the photographic data, and at least one predefined heuristic.

6. The computer-implemented method of any of clauses 1-5, further comprising displaying in the second section at least one element adjustable to select at least one of a size of points in the point cloud, a brightness correction, a contrast correction, an exposure correction, or a night vision mode correction.

7. The computer-implemented method of any of clauses 1-6, wherein a plurality of points in the rendered point cloud that are greater than a threshold distance from a viewer are enlarged in size based on an activation function.

8. The computer-implemented method of any of clauses 1-7, wherein the point cloud is down sampled from an original set of points by performing steps including combining points in the original set of points from a plurality of frames, spatially partitioning the combined points into a plurality of buckets, for each bucket of the plurality of buckets, sampling the bucket based on a sampling rate determined based on a number of points within the bucket and a user-selected density, and combining points remaining in the plurality of buckets, after each bucket in the plurality of buckets is sampled, as the point cloud.

9. The computer-implemented method of any of clauses 1-8, wherein the down sampling further preserves an order of a number of points within each of the buckets.

10. The computer-implemented method of any of clauses 1-9, wherein the point cloud is down sampled from an original set of points based on spatial density of points in the point cloud and at least one of the photographic data, the LIDAR intensity data, or a normal map.

11. The computer-implemented method of any of clauses 1-10, wherein the second section of the user interface is a pop-up panel.

12. Some embodiments include a computer-implemented method for visualizing a point cloud, the method comprising determining a plurality of point cloud colorings for the point cloud based on data from respective data sources, blending the plurality of point cloud colorings based on a user selection, rendering the point cloud based on the blended point cloud colorings, and displaying the rendering via a user interface.

13. The computer-implemented method of clause 12, wherein the user selection specifies at least one of a blend mode or a magnitude for blending the plurality of point cloud colorings.

14. The computer-implemented method of any of clauses 12-13, wherein the data sources include at least one of photographic data, label data, or light detection and ranging (LIDAR) intensity data.

15. The computer-implemented method of any of clauses 12-14, wherein the data sources include photographic data, and determining a point cloud coloring based on the photographic data includes, for each point within the point cloud, selecting a camera based on at least one of a distance from the camera to the point, an oblique angle, or a relative luminance of a photograph captured by the camera, mapping the point to a location in the photograph captured by the camera, determining a color for the point based on a weighted average of colors of a plurality of pixels closest to the mapped location in the photograph captured by the camera.

16. The computer-implemented method of any of clauses 12-15, further comprising, applying, to the colors of points in the point cloud, at least one of a brightness, a contrast, an exposure, or a night vision mode correction determined based on statistics calculated for a histogram of luminances in sub-regions of the photographic data, dominant colors determined from the photographic data, and at least one predefined heuristic.

17. The computer-implemented method of any of clauses 12-16, wherein, in the rendering of the point cloud, sizes of points in the point cloud decrease based on a distance from a viewer and increase based on an activation function that enlarges points in the point cloud that are greater than a threshold distance from the viewer.

18. The computer-implemented method of any of clauses 12-17, wherein the point cloud is down sampled from an original set of points by performing steps including combining points in the original set of points from a plurality of frames, spatially partitioning the combined points into a plurality of buckets, for each bucket of the plurality of buckets, sampling the bucket based on a sampling rate determined based on a number of points within the bucket and a user-selected density, and combining points remaining in the plurality of buckets, after each bucket in the plurality of buckets is sampled, as the point cloud.

19. The computer-implemented method of any of clauses 12-18, wherein the down sampling further preserves an order of a number of points within each of the buckets.

20. Some embodiments include a computer-readable storage medium including instructions that, when executed by a processing unit, cause the processing unit to perform operations for visualizing a point cloud, the operations comprising determining a plurality of point cloud colorings for the point cloud based on data from respective data sources, blending the plurality of point cloud colorings based on a user selection, rendering the point cloud based on the blended point cloud colorings, and displaying the rendering via a user interface.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for visualizing data, the method comprising:
    displaying, in a first section of a user interface, a rendering of a three-dimensional (3D) scene in which colors are determined based on (i) label data indicating types of one or more objects within the 3D scene, and (ii) at least one of photographic data or light detection and ranging (LIDAR) intensity data;
    applying, to the colors, at least one of (i) a brightness, (ii) a contrast, (iii) an exposure, or (iv) a night vision mode correction determined based on statistics calculated for a histogram of luminances in sub-regions of the photographic data, dominant colors determined from the photographic data, and at least one predefined heuristic, wherein applying comprises:
        determining a global histogram comprising a union of histograms of the relative luminances in the sub-regions of the photographic data;
        calculating the statistics for the global histogram;
        determining the dominant colors based on centroids of clusters in a color space of the photographic data; and
    determining one or more color properties to apply based on the statistics, the dominant colors, and the at least one predefined heuristic; and
    displaying, in a second section of the user interface, at least one element adjustable to select a blending of the colors, wherein the blending of the colors includes blending (i) a first color for a first point in the 3D scene determined based on a first label for the first point included in the label data, with (ii) a second color for the first point in the 3D scene determined based on at least one of:

one or more pixels in the photographic data corresponding to a location in a photograph to which the first point is mapped, or a LIDAR intensity of the first point in the LIDAR intensity data.

2. The computer-implemented method of claim 1, further comprising displaying, in a third section of the user interface, one or more photographs corresponding to the rendering of the 3D scene.

3. The computer-implemented method of claim 1, wherein:

the rendering of the 3D scene comprises a rendering of a point cloud; and the colors include colors of points in the point cloud determined based on the (i) label data, and (ii) the at least one of photographic data or LIDAR intensity data.

4. The computer-implemented of claim 3, wherein the colors of points in the point cloud are determined based on the photographic data by performing steps including, for each point within the point cloud:

selecting a camera based on at least one of a distance from the camera to the point or a relative luminance of a photograph captured by the camera;

mapping the point to a location in the photograph captured by the camera; and determining a color for the point based on a weighted average of colors of a plurality of pixels closest to the mapped location in the photograph captured by the camera.

5. The computer-implemented method of claim 3, further comprising displaying in the second section at least one element adjustable to select at least one of a size of points in the point cloud, a brightness correction, a contrast correction, an exposure correction, or the night vision mode correction.

6. The computer-implemented method of claim 3, wherein a first plurality of points in the rendered point cloud that are greater than a threshold distance from a viewer are enlarged in size based on an activation function, and a second plurality of points in the rendered point cloud that are less than or equal to the threshold distance from the viewer are not enlarged.

7. The computer-implemented method of claim 3, wherein the point cloud is down sampled from an original set of points by performing steps including:

combining points in the original set of points from a plurality of frames;

spatially partitioning the combined points into a plurality of buckets;

for each bucket of the plurality of buckets, sampling the bucket based on a sampling rate determined based on a number of points within the bucket and a user-selected density; and combining points remaining in the plurality of buckets, after each bucket in the plurality of buckets is sampled, as the point cloud.

8. The computer-implemented method of claim 7, wherein the down sampling further preserves an order of a number of points within each of the buckets.

9. The computer-implemented method of claim 3, wherein the point cloud is down sampled from an original set of points based on (i) spatial density of points in the point cloud, and (ii) at least one of the photographic data, the LIDAR intensity data, or a normal map.

10. One or more non-transitory computer readable media storing instructions that, when executed by one or more processors, cause the one or more processors to perform the steps of:

combining points in the original set of points from a plurality of frames;

spatially partitioning the combined points into a plurality of buckets;

for each bucket of the plurality of buckets, sampling the bucket based on a sampling rate determined based on a number of points within the bucket and a user-selected density;

combining points remaining in the plurality of buckets, after each bucket in the plurality of buckets is sampled, as the point cloud;

determining a plurality of point cloud colorings for the point cloud based on light detection and ranging (LIDAR) intensity data and label data indicating types of one or more objects associated with points in the point cloud;

blending the plurality of point cloud colorings based on a user selection, wherein the blending the plurality of point cloud colorings includes blending (i) a first color for a first point in the point cloud determined based on a first label for the first point included in the label data, with (ii) a second color for the first point in the point cloud determined based on a LIDAR intensity of the first point in the LIDAR intensity data;

rendering the point cloud based on the blended point cloud colorings; and displaying the rendering via a user interface.

11. The one or more non-transitory computer readable media of claim 10, wherein the instructions further cause the one or more processors to perform the step of blending the plurality of point cloud colors based on a third color for the first point in the point cloud determined based on one or more pixels corresponding to a location in a photograph to which the first point is mapped.

12. The one or more non-transitory computer readable media of claim 11, wherein the instructions further cause the one or more processors to perform the step of applying at least one of (i) a brightness, (ii) a contrast, (iii) an exposure, or (iv) a night vision mode correction to the third color determined based on statistics calculated for a histogram of luminances in sub-regions of photographic data, dominant colors determined from the photographic data, and at least one predefined heuristic.

13. The one or more non-transitory computer readable media of claim 12, wherein the instructions further cause the one or more processors to perform the step of adjusting the at least one of (i) the brightness, (ii) the contrast, (iii) the exposure, or (iv) the night vision mode correction based on one or more color property values received via the user interface.

14. The one or more non-transitory computer readable media of claim 12, wherein the at least one of (i) the brightness, (ii) the contrast, (iii) the exposure, or (iv) the night vision mode correction are applied in a predefined order.

15. The one or more non-transitory computer readable media of claim 10, wherein determining the plurality of point cloud colorings for the point cloud comprises parameterizing an activation function that controls the second color for the first point in the point cloud based on a distribution of intensity values in the LIDAR intensity data and a user-configurable sensitivity.

16. The one or more non-transitory computer readable media of claim 10, wherein an order of a number of points within each of the buckets is preserved.

17. The one or more non-transitory computer readable media of claim 10, wherein the instructions further cause the one or more processors to perform the step of down sampling the point cloud from an original set of points by:
deriving normal map data from LIDAR data associated with the point cloud;
determining, based on the normal map data, materials to which a cluster of points included in the original set of points belong; and
discarding a subset of points in the cluster based on the materials.

18. A system, comprising:
a memory that stores instructions, and
a processor that is coupled to the memory and, when executing the instructions, is configured to:
display, in a first section of a user interface, a rendering of a three-dimensional (3D) scene in which colors are determined based on (i) label data indicating types of one or more objects within the 3D scene, and (ii) photographic data;
applying, to the colors, at least one of (i) a brightness, (ii) a contrast, (iii) an exposure, or (iv) a night vision mode correction determined based on statistics calculated for a histogram of luminances in sub-regions of the photographic data, dominant colors determined from the photographic data, and at least one predefined heuristic,
wherein applying comprises:
determining a global histogram comprising a union of histograms of the relative luminances in the sub-regions of the photographic data;
calculating the statistics for the global histogram;
determining the dominant colors based on centroids of clusters in a color space of the photographic data; and
determining one or more color properties to apply based on the statistics, the dominant colors, and the at least one predefined heuristic; and
displaying, in a second section of the user interface, at least one element adjustable to select a blending of the colors, wherein the blending of the colors includes blending (i) a first color for a first point in the 3D scene determined based on a first label for the first point included in the label data, with (ii) a second color for the first point in the 3D scene determined based on one or more pixels in the photographic data corresponding to a location in a photograph to which the first point is mapped.

* * * * *